US012566353B2

(12) United States Patent
Li et al.

(10) Patent No.: US 12,566,353 B2
(45) Date of Patent: Mar. 3, 2026

(54) ELECTROCHROMIC DEVICE AND ELECTRONIC DEVICE

(71) Applicant: SHENZHEN GUANGYI TECH CO., LTD., Shenzhen (CN)

(72) Inventors: Jiacheng Li, Shenzhen (CN); Guoyang Hu, Shenzhen (CN); Haifeng Chen, Shenzhen (CN); Zhirui Shi, Shenzhen (CN); Chaoyue Cao, Shenzhen (CN); Zhenzhao Liu, Shenzhen (CN); Jianyu Peng, Shenzhen (CN)

(73) Assignee: SHENZHEN GUANGYI TECH CO., LTD., Shenzhen (CN)

( * ) Notice: Subject to any disclaimer, the term of this patent is extended or adjusted under 35 U.S.C. 154(b) by 393 days.

(21) Appl. No.: 18/117,684

(22) Filed: Mar. 6, 2023

(65) Prior Publication Data

US 2023/0221608 A1 Jul. 13, 2023

Related U.S. Application Data

(63) Continuation-in-part of application No. PCT/CN2021/116339, filed on Sep. 3, 2021.

(30) Foreign Application Priority Data

| | | |
|---|---|---|
| Sep. 4, 2020 | (CN) | 202010920683.8 |
| Jan. 22, 2021 | (CN) | 202110084919.3 |
| Jul. 21, 2021 | (CN) | 202110826680.2 |

(51) Int. Cl.
*G02F 1/161* (2006.01)
*G02F 1/153* (2006.01)
*G02F 1/1333* (2006.01)

(52) U.S. Cl.
CPC ............ *G02F 1/1533* (2013.01); *G02F 1/161* (2013.01); *G02F 1/133305* (2013.01);
(Continued)

(58) Field of Classification Search
CPC .. G02F 1/1533; G02F 1/161; G02F 1/133305; G02F 2001/1536; G02F 2202/16; G02F 2202/28; G02F 1/155
See application file for complete search history.

(56) References Cited

U.S. PATENT DOCUMENTS

| | | | |
|---|---|---|---|
| 6,061,168 | A | 5/2000 | Ishima et al. |
| 2004/0160657 | A1 | 8/2004 | Tonar et al. |

(Continued)

FOREIGN PATENT DOCUMENTS

| | | |
|---|---|---|
| CN | 1380990 A | 11/2002 |
| CN | 1510494 A | 7/2004 |

(Continued)

OTHER PUBLICATIONS

International Search Report with English Translation for PCT Application No. PCT/CN2021/116339, dated Dec. 9, 2021, pp. 1-4.

(Continued)

*Primary Examiner* — Tuyen Tra
(74) *Attorney, Agent, or Firm* — Dickinson Wright PLLC

(57) ABSTRACT

An electrochromic device, comprising a first conductive base layer, an electrochromic layer and a second conductive base layer stacked in sequence. The first conductive base layer comprises a first transparent conductive layer and a first base material layer stacked in sequence; the first transparent conductive layer is adhered to one side of the electrochromic layer; the second conductive base layer comprises a second transparent conductive layer and a second base material layer stacked in sequence; the second transparent conductive layer is adhered to the other side of the electrochromic layer; a partition groove is provided in the second transparent conductive layer for partitioning the second transparent conductive layer into a first conductive area and a second conductive area independent of each other; a conduction member is provided on the second (Continued)

conductive area, and the first transparent conductive layer is electrically connected to the second conductive area by the conduction member.

16 Claims, 11 Drawing Sheets

(52) U.S. Cl.
CPC .. *G02F 2001/1536* (2013.01); *G02F 2202/16* (2013.01); *G02F 2202/28* (2013.01)

(56) References Cited

U.S. PATENT DOCUMENTS

| 2007/0152956 A1 | 7/2007 | Danner et al. |
|---|---|---|
| 2009/0052006 A1 | 2/2009 | Xu et al. |
| 2009/0303565 A1 | 12/2009 | Karmhag et al. |
| 2011/0222139 A1 | 9/2011 | Naijo et al. |
| 2012/0019889 A1 | 1/2012 | Lamine et al. |
| 2014/0268279 A1 | 9/2014 | Veenman et al. |
| 2014/0376075 A1 | 12/2014 | Dubrenat et al. |
| 2018/0024401 A1 | 1/2018 | Stray et al. |
| 2018/0081249 A1 | 3/2018 | Choi et al. |
| 2018/0107085 A1 | 4/2018 | Jung et al. |
| 2019/0006538 A1 | 1/2019 | Cho et al. |
| 2020/0150507 A1 | 5/2020 | Chen et al. |

FOREIGN PATENT DOCUMENTS

| CN | 1643444 A | 7/2005 |
|---|---|---|
| CN | 1949070 A | 4/2007 |
| CN | 101297340 A | 10/2008 |
| CN | 101445723 A | 6/2009 |
| CN | 102460292 A | 5/2012 |
| CN | 102662276 A | 9/2012 |
| CN | 102929063 A | 2/2013 |
| CN | 103869551 A | 6/2014 |
| CN | 105093629 A | 11/2015 |
| CN | 106926781 A | 7/2017 |
| CN | 107422565 A | 12/2017 |
| CN | 108646495 A | 10/2018 |
| CN | 108646497 A | 10/2018 |
| CN | 109073949 A | 12/2018 |
| CN | 110471230 A | 11/2019 |
| CN | 209765230 U | 12/2019 |
| CN | 110928096 A | 3/2020 |
| CN | 111142303 A | 5/2020 |
| CN | 111399300 A | 7/2020 |
| CN | 111443545 A | 7/2020 |
| CN | 111580320 A | 8/2020 |
| CN | 112394581 A | 2/2021 |
| CN | 112394583 A | 2/2021 |
| CN | 112415827 A | 2/2021 |
| CN | 212623492 U | 2/2021 |
| CN | 212623493 U | 2/2021 |
| CN | 213365229 U | 6/2021 |
| DE | 102009058136 A1 | 6/2011 |
| JP | H10197907 A | 7/1998 |
| JP | 2018132718 A | 8/2018 |
| JP | 2019191481 A | 10/2019 |
| KR | 20090102113 A | 9/2009 |
| KR | 20170102188 A | 9/2017 |
| WO | 2018193822 A1 | 10/2018 |

OTHER PUBLICATIONS

International Search Report with English Translation for PCT Application No. PCT/CN2021/079013, dated Jun. 3, 2021, pp. 1-8.

First Office Action with English Translation for Chinese Application No. 202110826680.2, pp. 1-10.

First Office Action with English Translation for Chinese Application No. 202010929900.X, pp. 1-16.

Second Office Action with English Translation for Chinese Application No. 202010929900.X, pp. 1-8.

Wu et al., "High-Performance Electrofluorochromic Devices Based on Electrochromism and Photoluminescence-Active Novel Poly(4-Cyanotriphenylamine)," Advanced Functional Materials Journal, 2014, pp. 1-8.

Hanxiang et al., "Advances in Inorganic All-solid-state Electrochromic Materials and Devices," Journal of Inorganic Materials, May 2020, pp. 1-14, vol. 35, No. 5.

ELECTROCHROMIC DEVICE AND ELECTRONIC DEVICE

CROSS-REFERENCE TO RELATED APPLICATION(S)

This is a continuation-in-part application of International Patent Application No. PCT/CN2021/116339, filed on Sep. 3, 2021, which claims priority to Chinese Patent Application No. 202110826680.2 filed on Jul. 21, 2021, Chinese Patent Application No. 202110084919.3 filed on Jan. 22, 2021, and Chinese Patent Application No. 202010920683.8 filed on Sep. 4, 2020, the disclosures of which are incorporated herein by reference in their entireties.

TECHNICAL FIELD

The present application belongs to the technical field of color-changing devices and, in particular, relates to an electrochromic device and an electronic device.

BACKGROUND

Electrochromic phenomenon refers to a reversible redox reaction of a material under an action of an external electric field, resulting in changes in optical performance (such as transmittance, absorptance and reflectivity) of the material, which are manifested as reversible changes in color and transparency in appearance. Therefore, electrochromic devices have been widely applied to the industry fields of electrochromic energy-saving smart windows, automotive rear-view anti-glare mirrors and display devices.

At present, many researchers are devoted to the research of new electrochromic devices and apparatuses. For example, CN111142303A discloses an improved structure of an electrochromic rear-view mirror, which includes a rear-view mirror body, a display may be disposed on a rear side of the rear-view mirror, and the rear-view mirror body includes a first lens group, a second lens group, an electrochromic layer, two conductive sheets, a first conductive adhesive and a second conductive adhesive, where the first lens group is provided with a first plating layer, the second lens group is provided with a second plating layer, the electrochromic layer includes an encapsulating frame adhesive and an electrochromic material, one side of each of the two conductive sheets is a conductive portion, the other side of each of the two conductive sheets is a contact portion, the conductive portions of the two conductive sheets are respectively bonded to the second lens group, and the display is electrically connected to the contact portions of the two conductive sheets through soldering. CN213365229U discloses an electrochromic device. The electrochromic device includes a first conductive layer, an electrochromic layer, a second conductive layer and a leading out electrode, where the first conductive layer, the electrochromic layer and the second conductive layer are stacked. The first conductive layer includes a first overlapping region and a first staggered region, and the second conductive layer includes a second overlapping region and a second staggered region, at least a portion of the first staggered region and at least a portion of the second staggered region are located on the same side of the electrochromic layer, a first busbar is disposed on the first conductive layer, a second busbar is disposed on the second conductive layer, and the leading out electrode is respectively conductive to the first busbar and the second busbar.

In the prior art, when an electrochromic device is subjected to electrode leading out, an electrode lead connected to a first conductive layer and an electrode lead connected to a second conductive layer are generally led out from upper and lower conductive substrates, respectively. Thermocompression welding twice are needed when a leading out electrode is bound. For example, after the electrode lead of the lower sheet is welded, the electrochromic device is turned over, and the electrode lead of the upper sheet is welded. The process is complex, which is not conductive to automatic production, and the production efficiency is low, which is not conductive to improving a yield. Therefore, there is an urgent need in the art to develop an electrochromic device having a more simplified leading out manner and a simple manufacturing process.

SUMMARY

The present application provides an electrochromic device and an electronic device. The electrochromic device only needs thermocompression welding once to complete an electrode leading out process. The process is simple and convenient, which significantly improves the production efficiency, and it is conducive to improving a product yield.

In a first aspect, the present application provides an electrochromic device. The electrochromic device includes a first conductive base layer, an electrochromic layer and a second conductive base layer which are stacked in sequence; wherein, the first conductive base layer includes a first transparent conductive layer and a first substrate layer which are stacked in sequence, and the first transparent conductive layer is bonded to one side of the electrochromic layer; wherein, the second conductive base layer includes a second transparent conductive layer and a second substrate layer which are stacked in sequence, and the second transparent conductive layer is bonded to the other side of the electrochromic layer;

a partition groove is disposed in the second transparent conductive layer to divide the second transparent conductive layer into a first conductive region and a second conductive region which are independent of each other; a conduction member is disposed on the second conductive region, and the first transparent conductive layer is electrically connected to the second conductive region through the conduction member.

In the electrochromic device provided in the present application, the partition groove is disposed in the second transparent conductive layer to divide the second transparent conductive layer into two regions which are separated from each other so that the first conductive region and the second conductive region are not electrically connected to each other, and the first transparent conductive layer is electrically connected to the second conductive region through the conduction member, thereby achieving the electrode leading out from the same side. Both an electrode lead for connecting the first transparent conductive layer and an electrode lead for connecting the second transparent conductive layer can be led out from the second transparent conductive base layer, which facilitates the welding of the two electrode leads of the electrochromic device being completed simultaneously through thermocompression welding once. The process is simple, the production efficiency and the product yield are improved, and it is conducive to achieving automatic production and reducing an area of an electrode leading out region where no color-changing occurs (a change in color/transmittance) as much as possible.

Preferably, at least a portion of the electrochromic layer corresponding to the second conductive region is removed to form a conduction opening, and the conduction member having conductivity is poured into the conduction opening.

Exemplarily, the electrochromic device is manufactured through the following method, and the method includes: the second transparent conductive layer is etched, so as to dispose the partition groove to divide the second transparent conductive layer into the first conductive region and the second conductive region which are independent of each other; at least a portion of the electrochromic layer corresponding to the second conductive region is removed to form the conduction opening, and a material of the conduction member in liquid form is poured into the conduction opening; after the material in liquid form is changed into the conduction member in solid form, the conduction member is individually connected to the first transparent conductive layer and the second conductive region located at the conduction opening so that the first transparent conductive layer is electrically connected to the second conductive region, thereby achieving the electrode leading out from the same side. Therefore, both the electrode lead for connecting the first transparent conductive layer and the electrode lead for connecting the second transparent conductive layer can be led out from the second conductive base layer, which facilitates the welding of the two electrode leads of the electrochromic device being completed simultaneously through thermocompression welding once. The process is simple, which is conducive to achieving the automatic production, and the working efficiency and the product yield are improved.

Preferably, at least a surface of the first conductive region close to one side of the partition groove is covered by the electrochromic layer. In this manner, the conduction member is not in contact with the first conductive region so that the first conductive region is not electrically connected to the second conductive region, thereby avoiding a short circuit of the electrochromic device.

Preferably, at least a portion of a surface of a peripheral side of the conduction member is in close proximity to the electrochromic layer, so as to support and fix the conduction member, thereby ensuring the reliability of the first transparent conductive layer being electrically connected to the second conductive region through the conduction member; further preferably, the entire surface of the peripheral side of the conduction member is in close proximity to the electrochromic layer so that a better supporting effect and stability can be obtained.

Preferably, at least a portion of the surface of the peripheral side of the conduction member is not in close proximity to the electrochromic layer. In this manner, when the electrochromic device is manufactured, the process is easier to achieve, thereby improving the product yield.

Preferably, the conduction opening penetrates through the first conductive base layer. In this manner, the material of the conduction member in liquid form is easily poured into the conduction opening from a top along a side of the electrochromic device close to the conduction opening so that the electrical connection between the conduction member and the first transparent conductive layer and the electrical connection between the conduction member and the second conductive region are more stable.

Preferably, at least a portion of a surface of a top side of the conduction member overflows the conduction opening and covers at least a portion of a surface of the first conductive base layer away from the electrochromic layer. In this manner, end surfaces of the conduction member and the first conductive base layer are not prone to cracking, so as to avoid a failure in the electrical connection between the first transparent conductive layer and the second conductive region with a better bonding effect, higher stability and an improved production yield.

Preferably, the electrochromic layer includes an electrochromic material layer, an electrolyte layer and an ion storage layer which are stacked in sequence.

In the present application, materials of the electrochromic material layer, the electrolyte layer and the ion storage layer may be materials known in the prior art. Exemplarily, the material of the electrochromic material layer may be specifically selected from chromic materials in the prior art which can form a solid thin film, such as $NiO$, $WO_3$, $Nb_2O_5$, $TiO_2$ and the like among inorganic materials; a polythiophene derivative and a copolymer system and the like among organic materials; and metal conjugated systems such as Prussian blue and the like. The electrolyte layer is preferably a solid-state electrolyte layer. An electrolyte solution is cured to form the solid-state electrolyte layer. The material of the electrolyte layer includes a mixture of a polymer, a metal ion salt and an additive. The material of the ion storage layer includes a metal oxide formed by one or at least two metal elements in Groups 4 to 12, or a mixture of metal oxides, or a metal oxide doped with any other metal oxide.

Preferably, the electrochromic material layer has a thickness of 1 nm to 10 μm, which may be, for example, 1 nm, 5 nm, 10 nm, 50 nm, 80 nm, 100 nm, 200 nm, 500 nm, 1 μm, 5 μm or 10 μm, etc. A moderate increase of the thickness of the electrochromic material layer is conducive to deepening a color effect of the electrochromic device.

Preferably, the electrolyte layer has a thickness of 5 to 200 μm, which may be, for example, 5 μm, 8 μm, 10 μm, 20 μm, 30 μm, 40 μm, 50 μm, 60 μm, 70 μm, 80 μm, 90 μm, 100 μm, 110 μm, 120 μm, 130 μm, 150 μm, 160 μm, 180 μm or 200 μm, etc.

Preferably, the ion storage layer has a thickness of 1 nm to 10 μm, which may be, for example, 1 nm, 5 nm, 10 nm, 50 nm, 80 nm, 100 nm, 200 nm, 500 nm, 1 μm, 5 μm or 10 μm, etc.

Preferably, the electrochromic device further includes a first busbar, the first busbar disposed on a surface and/or an interior of the first transparent conductive layer and connected to the conduction member; so that it is conducive to quickly transmitting electrons from the conduction member to the entire first transparent conductive layer and improving a conductive rate and a color-changing speed.

It is to be added that a second busbar may be disposed on the first conductive region and the second conductive region, and the conductive performance is further improved on the basis that the first conductive region and the second conductive region are conductive, thereby further improving a conduction yield.

Preferably, materials of the first busbar and the second busbar are each independently a metal material having relatively high electrical conductivity, for example, any one or a combination of at least two of conductive silver paste, conductive copper paste, conductive carbon paste, nanosilver conductive ink, copper foil, copper wire or conductive adhesive film, further preferably the conductive silver paste.

Preferably, a first substrate (a first water-oxygen barrier layer) is disposed on a side of the first substrate layer away from the electrochromic layer, and/or a second substrate (a second water-oxygen barrier layer) is disposed on a side of the second substrate layer away from the electrochromic layer, thereby better isolating external water vapor and oxygen and preventing the water vapor and the oxygen from entering the electrochromic layer to affect a normal operation of the electrochromic layer.

In the present application, the water-oxygen barrier layer may be hard glass or a flexible water-oxygen barrier film in the prior art, which is not repeated here.

Preferably, the electrochromic device further includes an optical adhesive layer bonded to the side of the first substrate layer and/or the second substrate layer away from the electrochromic layer; the optical adhesive layer can effectively connect the water-oxygen barrier layer to the first substrate layer and/or the second substrate layer with firm and stable connection and good bonding strength. For clarity, an optical adhesive layer between the first substrate layer and the first substrate (the first water-oxygen barrier layer) is defined as a first optical adhesive layer, and an optical adhesive layer between the second substrate layer and the second substrate (the second water-oxygen barrier layer) is defined as a second optical adhesive layer.

Preferably, a material of the optical adhesive layer includes any one or a combination of at least two of PolyVinyl Butyral (PolyVinyl Butyral, PVB), Ethylene-vinyl Acetate Copolymer (Ethylene-vinyl Acetate Copolymer, EVA), OCA optically adhesive (Optically Clear Adhesive) optical adhesive, SCA optical adhesive, ionic intermediate film, Liquid Optically Clear Adhesive LOCA (Liquid Optically Clear Adhesive) or acrylic.

Preferably, the top side of the conduction member covers below the first conductive base layer. In this manner, a contact area between the conduction member and the first conductive base layer is greater, thereby improving the conduction yield.

Preferably, the conduction member includes a first conduction body and a second conduction body which are connected to each other, where the first conduction body is connected to a side of the first transparent conductive layer away from the first substrate layer, and the second conduction body is disposed on a side of the second conductive region away from the second substrate layer.

Preferably, the first conduction body and the second conduction body are docked; the first conductive region is connected to a first leading out electrode, and the second conductive region is connected to a second leading out electrode;

the electrochromic layer includes an electrochromic material layer, an electrolyte layer and an ion storage layer which are stacked in sequence; a second partition region is disposed in the electrochromic layer, and a projection of the second partition region on the second transparent conductive layer at least partially coincides with the partition groove.

In the present application, being docked means that a side of the first conduction body away from the first transparent conductive layer and a side of the second conduction body away from the second conductive region are fit snugly around each other.

In the present application, the first leading out electrode and the second leading out electrode are made of a conductive material such as a metal, an alloy, a wire, a flexible circuit board and the like.

As a preferred technical solution of the present application, the second transparent conductive layer of the electrochromic device is divided into two regions which are independent of each other by the partition groove, and both the first leading out electrode and the second leading out electrode are led out from the second transparent conductive base layer. During welding, a flexible circuit board which integrates two leading out lines may be used so that the welding leading out of the first leading out electrode and the second leading out electrode can be achieved simultaneously through thermocompression once on one side of the second transparent conductive layer. The production process is simplified, the production efficiency and the product yield are improved, and it is conducive to reducing the area of the electrode leading out region where no color-changing occurs (the change in color/transmittance). Moreover, to avoid an occurrence of a micro-short circuit inside the electrochromic device, the second partition region is disposed in the electrochromic layer, thereby preventing a conductive substance or conductive particles in the electrochromic layer from filling the partition groove and avoiding a risk of a partition failure of the partition groove.

As a preferred technical solution of the present application, the electrochromic device is manufactured through the following method, and the method includes: a first laminate and a second laminate are manufactured respectively, wherein the first laminate includes a first substrate layer, a first transparent conductive layer and an electrochromic material layer which are stacked in sequence, and the second laminate includes a second substrate layer, a second transparent conductive layer and an ion storage layer which are stacked in sequence, or, the first laminate includes a first substrate layer, a first transparent conductive layer and an ion storage layer which are stacked in sequence, and the second laminate includes a second substrate layer, a second transparent conductive layer and an electrochromic material layer which are stacked in sequence; an electrolyte layer is disposed between the first laminate and the second laminate, and the first laminate and the second laminate are docked. The above first conduction body and the second conduction body are predisposed, and when the first laminate and the second laminate are docked, the first conduction body and the second conduction body can be docked so that it is very convenient to tightly connect the first transparent conductive layer to the second conductive region, thereby ensuring that the second electrode led out from the second conductive region of the second transparent conductive layer can well supply power to the first transparent conductive layer. The process is simple and convenient, and the production capacity is significantly improved.

Preferably, surface roughness of the first conduction body is greater than or equal to 3 μm, and/or surface roughness of the second conduction body is greater than or equal to 3 μm.

As a preferred technical solution of the present application, the surface roughness of the first conduction body and the second conduction body is set so that contact points of docking surfaces of the first conduction body and the second conduction body can be increased, thereby improving the tightness of contact of the first conduction body and the second conduction body, ensuring the effectiveness of the electrical connection between the first conduction body and the second conduction body and ensuring that the second electrode led out from the second conductive region can well supply power to the first transparent conductive layer.

Preferably, at least a portion of sides of the first conduction body and the second conduction body is in contact with the electrochromic layer, wherein the electrochromic material layer is located on a side close to the second transparent conductive layer, the second partition region is disposed in the electrochromic material layer, and divides the electrochromic material layer into two regions which are not connected to each other; or, the ion storage layer is located on a side close to the second transparent conductive layer, the second partition region is disposed in the ion storage layer, and divides the ion storage layer into two regions which are not connected to each other.

In the present application, at least a portion of the sides of the first conduction body and the second conduction body is in contact with the electrochromic layer so that no material void of the electrochromic layer is between the first conduction body, the second conduction body and the electrochromic layer, thereby reducing the area of the non-color-changing region. It is to be noted that a region lacking the material of the electrochromic layer forms the non-color-changing region. Moreover, the materials of the electrochromic material layer and the ion storage layer have tiny electronic conductivity in certain cases. Therefore, if the materials of the electrochromic material layer and the ion storage layer are filled in the partition groove, conductive materials of the first conductive region and the second conductive region can still be conducted through the material of the electrochromic material layer or the ion storage layer filled in the partition groove, resulting in the occurrence of the inside micro-short circuit. In addition, the partition groove may also be filled with conductive particles during processing, resulting in the occurrence of the inside micro-short circuit. Therefore, in the present application, the second partition region is disposed in the ion storage layer or the electrochromic material layer so that the product stability and service life of the electrochromic device are further improved.

In a possible embodiment, the second partition region is disposed in a side of the electrochromic material layer or the ion storage layer away from the second transparent conductive layer.

In another possible embodiment, the second partition region is disposed in a side of the second substrate layer away from the electrochromic material layer or the ion storage layer.

Preferably, the second partition region is filled with the same electrolyte material as that of the electrolyte layer so that the electrolyte layer is in contact with the partition groove through the electrolyte material in the second partition region.

It has been found in the present application that the material of the electrolyte layer is an electronic insulator. Therefore, in the present application, the electrolyte material is filled in the second partition region, thereby better avoiding the occurrence of the inside micro-short circuit and further improving the product stability and service life of the electrochromic device.

Preferably, a second busbar is disposed on the second transparent conductive layer.

In the present application, the second busbar is used for improving the uniformity of the voltage distribution of the second transparent conductive layer, thereby improving the color-changing speed and color-changing uniformity of the electrochromic device.

Preferably, a first busbar is disposed on the first transparent conductive layer, and the first conduction body is a portion of the first busbar, or, the first conduction body is connected to the first busbar.

A projection of the second busbar on the first transparent conductive layer does not coincide with a projection of the first busbar on the first transparent conductive layer.

In the present application, the first busbar is used for improving the uniformity of the voltage distribution of the first transparent conductive layer, thereby improving the color-changing speed and color-changing uniformity of the electrochromic device. The first conduction body is regarded as a portion of the first busbar, or the first busbar is extended to the first conduction body. In this manner, the first conduction body does not need to be separately disposed, and when the first busbar is made, the first conduction body can be made. The processing steps are simplified, and the production capacity is improved. The distribution of the first busbar and the second busbar on a plane surface is adjusted so that the first busbar is not in contact with the second busbar up and down in a direction from the second transparent conductive layer to the first transparent conductive layer. Once the first busbar is in contact with the second busbar, a short circuit failure of the electrochromic device is caused. In the present application, the product reliability of the electrochromic device is further improved through this design.

Preferably, a surface resistance of the second transparent conductive layer is greater than a surface resistance of the first transparent conductive layer, and the second busbar is disposed along a periphery of the first conductive region.

In the present application, when the first transparent conductive layer and the second transparent conductive layer have the same conductive material, the larger the surface resistance, the smaller the thickness of the conductive material, and the higher the light transmittance of the conductive layer, which can improve a display effect of a color of the electrochromic layer, but also causes non-uniform voltage distribution on the conductive layer, thereby reducing the color-changing rate and color-changing uniformity of the electrochromic layer. Therefore, in the present application, the second transparent conductive layer having a relatively large surface resistance and the first transparent conductive layer having a relatively small surface resistance are matched so that in a synergistic manner, the electrochromic device clearly displays the color of the electrochromic layer and an effect of quick and uniform color-changing is achieved. Since the second transparent conductive layer has a relatively large surface resistance, the second busbar needs to be disposed on the second transparent conductive layer so that the uniformity of the voltage distribution of the second transparent conductive layer is improved. The second busbar is disposed along the periphery of the first conductive region so that the color-changing speed and color-changing uniformity of the electrochromic device can be improved while ensuring that the electrochromic device has as large a color-changing region as possible. At a periphery of the first conductive region adjacent to the second conductive region, the second busbar may not be disposed to reduce the possibility of the short circuit. Since the first transparent conductive layer has a relatively small surface resistance, the first busbar may not be disposed on the first transparent conductive layer, and only the first conduction body is disposed, thereby saving a product cost. In the present application, the display effect of the color of the electrochromic layer and the product reliability, color-changing speed and color-changing uniformity of the electrochromic device are significantly improved through this design.

Optionally, the second busbar is not in contact with the electrochromic layer, thereby preventing a metal of the second busbar from participating in a redox reaction of the electrochromic device. When a surface of the material of the second busbar is passivated or covered with an insulating layer or the like, the second busbar may also be in contact with the electrochromic layer.

Preferably, a ratio of the surface resistance of the second transparent conductive layer to the surface resistance of the first transparent conductive layer is greater than or equal to 1.5, which may be, for example, 1.5, 2, 2.5, 3, 3.5, 4, 4.5, 5, 6, 7, 8, 9, 10, 15 or 20, and specific point values between the above point values. Due to the limitation of space and the consideration of simplicity, the specific point values included in the range are not exhaustively listed in the present application.

In the present application, within the above range of the ratio of the surface resistance, the second busbar is disposed on the second transparent conductive layer, and no busbar is disposed on the first transparent conductive layer so that in a better synergistic manner, the electrochromic device clearly displays the color of the electrochromic layer and the effect of quick and uniform color-changing is achieved.

Preferably, the surface resistance of the second transparent conductive layer is greater than the surface resistance of the first transparent conductive layer, and the electrochromic material layer is located on a side close to the second transparent conductive layer.

As a preferred technical solution of the present application, the electrochromic material layer is disposed on the side close to the second transparent conductive layer, and when a user views from an outside of the first transparent conductive layer, the display effect of the color of the electrochromic device is better.

Preferably, a first substrate is disposed on a side of the first substrate layer away from the first transparent conductive layer, and a second substrate is disposed on a side of the second substrate layer away from the second transparent conductive layer; the partition groove penetrates through the second substrate layer; a side of the first conduction body is in contact with and connected to a side of the second conduction body;

a region between the partition groove and the first transparent conductive layer is a first conduction region, and the first conduction region includes a first conduction body and a first sealant; wherein at least a portion of a surface of the first conduction body is covered with the first sealant so that the first conduction body is not in contact with the electrochromic layer and the second transparent conductive layer;

a region between the second conduction region and the first substrate is a second conduction region, and the second conduction region includes a second conduction body and a second sealant; wherein at least a portion of a surface of the second conduction body is covered with the second sealant.

In the present application, the "side" of the first conduction body refers to a side of the first conduction body perpendicular to the first transparent conductive layer, and the "side" of the second conduction body refers to a side of the second conduction body perpendicular to the second conductive region.

As a preferred technical solution of the present application, the electrochromic device can achieve the welding leading out through thermocompression welding once so that the production process is simplified and the production efficiency and the production yield are improved; meanwhile, the side of the first conduction body is in contact and conducted with the side of the second conduction body so that a contact area between the first conduction body and the second conduction body is significantly increased, thereby avoiding a poor contact and improving a conduction effect; moreover, the peripheral sides of the first conduction body and the second conduction body are filled with the sealant, on the one hand, it can ensure that the first conduction body is in close contact with the second conduction body, and on the other hand, the sealant can achieve a sealing effect to prevent water vapor from intruding into an electrochromic region. In addition, the first conduction body and the second conduction body are isolated from the first conductive region to achieve an insulating effect to avoid the short circuit.

Exemplarily, the electrochromic device is manufactured through the following method, and the method includes the steps:

(1) manufacturing of an electrochromic stack: the electrochromic stack includes a first substrate layer, a first transparent conductive layer, an electrochromic layer, a second transparent conductive layer and a second substrate layer which are stacked in sequence;

(2) manufacturing of a first conduction region and a second conduction region, separately:

wherein, a method for manufacturing the first conduction region includes: a partition groove is formed through cutting from one side of the second substrate layer, a second substrate layer, a second transparent conductive layer and an electrochromic layer in the partition groove are all removed; a conduction material is poured into the partition groove to form a first conduction body, and a surface of the first conduction body is filled with a first sealant; a second substrate is disposed on an outside of the second substrate layer to form the first conduction region;

a method for manufacturing the second conduction region includes: a second groove is formed through cutting from one side of the first substrate layer, a first substrate layer, a first transparent conductive layer and an electrochromic layer in the second groove are all removed; the conduction material is poured into the second groove to form a second conduction body, and a surface of the second conduction body is filled with a second sealant; a first substrate is disposed on an outside of the first substrate layer to form the second conduction region.

The partition groove divides the second substrate layer and the second transparent conductive layer into two regions that are not in contact with each other.

As a preferred technical solution of the present application, the method for manufacturing the first conduction region further includes: after the second substrate is disposed on the outside of the second substrate layer, the first sealant is cured.

Preferably, the method for manufacturing the second conduction region further includes: after the first substrate is disposed on the outside of the first substrate layer, the second sealant is cured.

Preferably, step (2) further includes: after the manufacturing of the first conduction region is completed, the electrochromic stack where the first conduction region has been formed is turned over to perform the manufacturing of the second conduction region; or, after the manufacturing of the second conduction region is completed, the electrochromic stack where the second conduction region has been formed is turned over to perform the manufacturing of the first conduction region.

In the present application, the double-sided cutting is performed, and the conduction material is spot-coated on (poured into) two sides so that a contact area between the first conduction body and the second conduction body is increased, thereby avoiding a poor contact and improving a conduction effect; moreover, the sealant is directly spot-coated on the first conduction body and the second conduction body so that the device is sealed, thereby improving a water-oxygen barrier effect of the electrochromic device, and a sealant layer can also achieve an insulating effect so that the conductive layer or the electrochromic layer does not need to be etched.

As a preferred technical solution of the present application, in the electrochromic stack manufactured in step (1), a first optical adhesive layer and a first back film are further disposed on an outer surface of the first substrate layer, and a second optical adhesive layer and a second back film are further disposed on an outer surface of the second substrate layer.

In step (2), the step of disposing the first substrate on the outside of the first substrate layer includes removing the first back film and attaching the first substrate to the first optical adhesive layer.

The step of disposing the second substrate on the outside of the second substrate layer includes removing the second back film and attaching the second substrate to the second optical adhesive layer.

As a preferred technical solution of the present application, after step (2) is finished, an electrochromic stack close to an outside of the second conduction region is cut off along an edge of the second sealant.

Preferably, a first busbar is disposed between the first conduction body and the first transparent conductive layer.

Preferably, a width of the first busbar is greater than a width of the first conduction body.

Preferably, a gap width between the first conduction body and the electrochromic layer is greater than a gap width between the first busbar and the electrochromic layer.

Preferably, other spaces in the first conduction region are all filled with the first sealant except a space occupied by the first conduction body and the first busbar.

In the present application, a certain gap width is set between the first conduction body and the electrochromic layer, thereby preventing the first conduction body from being in direct contact with the electrochromic layer and preventing the short circuit of the ion storage layer and the electrochromic material layer of the electrochromic layer through the first conduction body. Except the space occupied by the first conduction body and the first busbar includes at least a gap between the first conduction body and the electrochromic layer and a gap between the first conduction body and the partition groove (the second substrate). The gap between the first conduction body and the electrochromic layer is filled with the first sealant, and the gap between the first conduction body and the partition groove is filled with the first sealant. Through the insulating sealant, it ensures that the first conduction body is not in contact with the electrochromic layer and the first conductive region, thereby further achieving the insulating effect and avoiding the short circuit failure of the electrochromic device. Moreover, the first sealant seals a peripheral side of the electrochromic layer, which can also achieve an effect of isolating water vapor to prevent the water vapor from intruding into the electrochromic region, thereby prolonging the service life of the electrochromic device.

Preferably, a second busbar is disposed between the second conductive region and the second conduction body.

Preferably, a width of the second busbar is greater than a width of the second conduction body.

Preferably, other spaces in the second conduction region are all filled with the second sealant except a space occupied by the second conduction body and the second busbar.

In the present application, except the space occupied by the second conduction body and the second busbar includes at least a gap between the second conduction body and an outer edge of the electrochromic device and a gap between the second conduction body and the first substrate. An outer peripheral side of the second conduction body can be wrapped in the second sealant through filling the second sealant to prevent the second conduction body from being in contact with air and being oxidized. In addition, the second conduction body can further seal the peripheral side of the electrochromic layer to enhance a water-oxygen sealing effect.

Preferably, an interface between the first conduction region and the first conductive region is denoted as a first interface, and an interface between the first conduction region and the second conduction region is denoted as a second interface, wherein one end of the first busbar is located at the second interface, and the other end of the first busbar is located at the first interface or a gap is reserved between the other end of the first busbar and the first interface.

It is to be noted that the width of the first busbar may be equal to a width of the first conduction region, that is, the first busbar is laid from the first interface to the second interface. Preferably, the width of the first busbar is slightly shorter than the width of the first conduction region. One end of the first busbar is flush with the second interface, a certain gap is reserved between the other end of the first busbar and the first interface, and the gap is also filled with the first sealant. A reason for reserving the gap is to facilitate a process operation. When the first conduction body is disposed, enough space for the operation can be left, thereby reducing the possibility of the short circuit.

Preferably, one end surface of the first conduction body is in surface contact with one end surface of the second conduction body at the second interface, a gap is reserved between the other end surface of the first conduction body and the first interface and filled with the first sealant, and a gap is reserved between the other end of the second conduction body and an outer edge of the electrochromic device and filled with the second sealant.

As a preferred technical solution of the present application, the gap between the first conduction body and the electrochromic layer is filled with the first sealant to ensure that the first conduction body is not in contact with the electrochromic layer and the first conductive region, thereby achieving the insulating effect and avoiding the short circuit failure of the electrochromic device. Meanwhile, the first sealant seals the peripheral side of the electrochromic layer, which can also achieve the effect of isolating water vapor to prevent the water vapor from intruding into the electrochromic region, thereby prolonging the service life of the electrochromic device. The outer peripheral side of the second conduction body is wrapped by the second sealant to prevent the second conduction body from being in contact with air and being oxidized. In addition, the second sealant can further seal the peripheral side of the electrochromic layer to enhance the water-oxygen sealing effect.

Preferably, one end surface of the first conduction body and one end of the first busbar are each in surface contact with one end surface of the second conduction body at the second interface.

As a further preferred technical solution, contact states of the first conduction body and the second conduction body are not specifically required or specially limited in the present application, as long as the following two requirements are simultaneously satisfied:

(1) the side of the first conduction body is in contact with the side of the second conduction body, and the first conduction body and the second conduction body are connected to form the conduction member;

(2) a surface of the first conduction body is not in direct contact with a structural layer on an opposite side, and similarly, a surface of the second conduction body is also not in direct contact with the structural layer on the opposite side.

Under the premise of satisfying the above requirements, the contact states and a height position relationship of each surface of the first conduction body and the second conduction body may have multiple variations. To clearly describe the height position relationship of the each surface of the first conduction body and the second conduction body, surfaces on both sides of the first conduction body and the second conduction body are named respectively: a contact surface between the first conduction body and the first busbar is denoted as a first contact surface, and a surface on an opposite side of the first contact surface is denoted as a first surface; similarly, a contact surface between the second conduction body and the second busbar is denoted as a second contact surface, and a surface on an opposite side of the second contact surface is denoted as a second surface.

Exemplarily, the present application provides the following four optional height position relationships of each surface:

(1) the first contact surface is higher than the second surface, and an extension surface of the first surface is located between the second surface and the second contact surface, which is equivalent to a thickness of the first conduction body being equivalent to a thickness of the second conduction body; a contact side of the first conduction body and a contact side of the second conduction body have mutually staggered regions, and the first conduction body is higher than the second conduction body as a whole;

(2) both an extension surface of the first contact surface and an extension surface of the first surface are located between the second surface and the second contact surface, which is equivalent to a thickness of the first conduction body being less than a thickness of the second conduction body; a contact side of the second conduction body completely covers a contact side of the first conduction body;

(3) an extension surface of the first contact surface is located between the second surface and the second contact surface, the first surface is lower than the second contact surface, and an extension line of the first surface is located between surfaces on both sides of the second busbar, which is equivalent to a thickness of the first conduction body being equivalent to a thickness of the second conduction body; a contact side of the first conduction body and a contact side of the second conduction body are staggered from each other, and the first conduction body is lower than the second conduction body as a whole; or (4) the first contact surface is higher than the second surface, an extension surface of the second surface is located between the first surface and the first contact surface, and an extension surface of the first surface is located between surfaces on both sides of the second busbar, which is equivalent to a thickness of the first conduction body being greater than a thickness of the second conduction body; a contact side of the first conduction body completely covers a contact side of the second conduction body.

Of course, the above four positional relationships are only exemplary expressions, which do not mean that only the above four cases are included. Any positional state that satisfies the conduction requirements may be used in the present application.

Preferably, a first optical adhesive layer is disposed between the first substrate and the first substrate layer, and a second optical adhesive layer is disposed between the second substrate and the second substrate layer.

Preferably, the first substrate and/or the second substrate are/is a water-oxygen barrier film.

Preferably, the first substrate and/or the second substrate are/is an appearance texture film.

In the present application, the appearance texture film is a film having a texture pattern effect.

In the present application, the first transparent conductive layer and the second transparent conductive layer have good light transmittance for displaying a variation in optical property of the electrochromic device, and the materials of the first transparent conductive layer and the second transparent conductive layer include, but are not limited to, any one or a combination of at least two of indium tin oxide (ITO), aluminum zinc oxide (AZO), fluorine-doped tin oxide (FTO), silver nanowire, graphene, carbon nanotube, metal mesh or silver nanoparticle.

Preferably, thicknesses of the first transparent conductive layer and the second transparent conductive layer are each independently 0.1 nm to 10 μm, which may be, for example, 0.1 nm, 0.5 nm, 1 nm, 5 nm, 10 nm, 100 nm, 500 nm, 1 μm, 3 μm, 5 μm, 7 μm or 10 μm, and specific point values between the above point values. Due to the limitation of space and the consideration of simplicity, the specific point values included in the range are not exhaustively listed in the present application, and the thicknesses are each further preferably 0.1 nm to 1 μm.

Preferably, at least one of the first substrate layer and the second substrate layer is preferably transparent for displaying the variation in optical property of the electrochromic device.

Preferably, materials of the first substrate layer and the second substrate layer each independently include glass, plastic. The plastic includes, but is not limited to, any one or a combination of at least two of polyethylene terephthalate (PET), cyclic olefin copolymer or cellulose triacetate.

Preferably, thicknesses of the first substrate layer and the second substrate layer are each independently 20 to 500 μm, which may be, for example, 20 μm, 50 μm, 100 μm, 150 μm, 200 μm, 250 μm, 300 μm, 350 μm, 400 μm, 450 μm or 500 μm, and specific point values between the above point values. Due to the limitation of space and the consideration of simplicity, the specific point values included in the range are not exhaustively listed in the present application. When the material of the substrate layer is glass, the thickness of the substrate layer is not excessively limited, and those skilled in the art may rationally select according to an actual application.

Preferably, the first substrate layer and/or the second substrate layer are/is a flexible substrate layer.

As a preferred technical solution of the present application, at least one of the first substrate layer and the second substrate layer is set as a flexible substrate layer which is bendable, thereby reducing an accuracy requirement for the thickness of the conduction member (the first conduction body and the second conduction body). In the case where the conduction member (the first conduction body or the second conduction body) is slightly thicker or thinner, it can still ensure the tight connection between the first transparent conductive layer and the second conductive region, reduce the possibility of the disconnection of an interior of the conduction member (for example, between the first conduction body and the second conduction body), avoid an open circuit of the electrochromic device and improve the feasibility of the process and the product yield of the electrochromic device.

Preferably, a material of the conduction member includes any one or a combination of at least two of conductive silver paste, conductive copper paste, conductive carbon paste and nano-silver conductive ink, further preferably the conductive silver paste.

Preferably, the electrochromic device further includes a sealing member disposed along the peripheral side of the electrochromic layer. In this manner, the peripheral side of the electrochromic layer can be sealed to prevent the intrusion of water vapor and the like, thereby improving the service life of the electrochromic device.

In a second aspect, the present application provides an electronic device. The electronic device includes the electrochromic device as described in the first aspect.

In the present application, the electronic device including the above electrochromic device has a low production cost, a simple and convenient production process, high production efficiency, a high product yield and good product stability.

Compared with the prior art, the present application has the beneficial effects described below.

In the electrochromic device provided in the present application, the partition groove is disposed in the second transparent conductive layer to divide the second transparent conductive layer into two regions which are separated from each other so that the first transparent conductive layer is electrically connected to the second conductive region through the conduction member, thereby achieving the electrode leading out from the same side. Both the electrode lead for connecting the first transparent conductive layer and the electrode lead for connecting the second transparent conductive layer can be led out from the second transparent conductive base layer, which facilitates the welding of the two electrode leads of the electrochromic device being completed simultaneously through thermocompression welding once. The process is simple, the production efficiency and the capacity are improved, the product yield is improved, and it is conducive to achieving the automatic production and reducing the area of the electrode leading out region where no color-changing occurs as much as possible.

DETAILED DESCRIPTION

Figure 1:
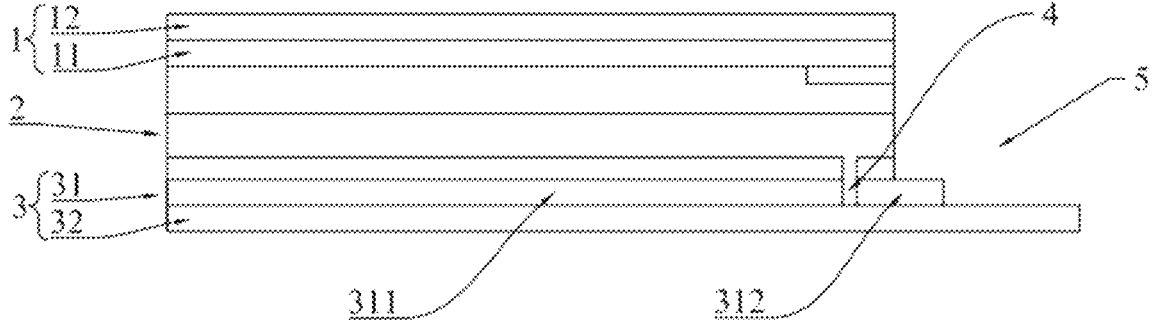
FIG. 1 is a structure diagram of an electrochromic device where a conduction member has not been disposed according to a specific embodiment.

Technical solutions of the present application are further described below through specific embodiments. Those skilled in the art are to understand that the embodiments described herein are used for a better understanding of the present application and are not to be construed as specific limitations to the present application.

In a specific embodiment, as shown in FIGS. 1 to 6, an electrochromic device includes a first conductive base layer 1, an electrochromic layer 2 and a second conductive base layer 3 which are stacked in sequence. The first conductive base layer 1 includes a first transparent conductive layer 11 and a first substrate layer 12 which are stacked in sequence, and the first transparent conductive layer 11 is bonded to one side of the electrochromic layer 2. The second conductive base layer 3 includes a second transparent conductive layer 31 and a second substrate layer 32 which are stacked in sequence, and the second transparent conductive layer 31 is bonded to the other side of the electrochromic layer 2. A partition groove 4 is disposed in the second transparent conductive layer 31 to divide the second transparent conductive layer 31 into a first conductive region 311 and a second conductive region 312 which are independent of each other. At least a portion of the electrochromic layer 2 corresponding to the second conductive region 312 is removed to form a conduction opening 5, a conduction member 6 having conductivity is poured into the conduction opening 5, and the conduction member 6 is used for electrically connecting the first transparent conductive layer 11 to the second conductive region 312.

It is to be noted that the second transparent conductive layer 31 is etched, so as to dispose the partition groove 4 to divide the second transparent conductive layer 31 into the first conductive region 311 and the second conductive region 312 which are independent of each other, at least a portion of the electrochromic layer 2 corresponding to the second conductive region 312 is removed to form the conduction opening 5, a conduction material in liquid form is poured into the conduction opening 5 and changed into the conduction member 6 in solid form, and the conduction member 6 is respectively connected to the first transparent conductive layer 11 and the second conductive region 312 located at the conduction opening 5 so that the first transparent conductive layer 11 is electrically connected to the second conductive region 312, thereby achieving the electrode leading out from the same side. Therefore, both an electrode lead for connecting the first transparent conductive layer 11 and an electrode lead for connecting the second transparent conductive layer 31 can be led out from the second conductive base layer 3, which facilitates the welding of the two electrode leads of the electrochromic device being completed simultaneously through thermocompression welding once. The process is simple, which is conducive to achieving automatic production, and the work efficiency and the product yield are significantly improved.

Optionally, as shown in FIGS. 1 to 6, at least a surface of the first conductive region 311 close to the partition groove 4 is covered by the electrochromic layer 2.

It is to be explained and noted that since the surface of the first conductive region 311 close to the partition groove 4 is covered by the electrochromic layer 2, it can ensure that after the conduction member 6 is poured into the conduction opening 5, the conduction member 6 is not in contact with the first conductive region 311, so that the first conductive region 311 is not electrically connected to the second conductive region 312, thereby avoiding a short circuit of the electrochromic device.

Optionally, as shown in FIGS. 2, 3, 4, 5 and 6, at least a portion of a surface of a peripheral side of the conduction member 6 is in close proximity to the electrochromic layer 2.

It is to be noted that at least a portion of the surface of the peripheral side of the conduction member 6 is in close proximity to the electrochromic layer 2, so as to support and fix the conduction member 6, thereby ensuring the reliability of the first transparent conductive layer 11 being electrically connected to the second conductive region 312 through the conduction member 6. In some embodiments shown in FIGS. 2 and 3, a portion of the surface of the peripheral side of the conduction member 6 is in close proximity to the electrochromic layer 2, and the conduction opening 5 is set to be opened. In some embodiments shown in FIGS. 4 and 5, the entire surface of the peripheral side of the conduction member 6 is in close proximity to the electrochromic layer 2, and the conduction opening 5 is in a form of a receiving groove or a receiving cavity. That the entire surface of the peripheral side of the conduction member 6 is in close proximity to the electrochromic layer 2 has a better and more stable supporting effect than that a portion of the surface of the peripheral side of the conduction member 6 is in close proximity to the electrochromic layer 2.

Optionally, as shown in FIGS. 1 to 4 and FIG. 6, the conduction opening 5 penetrates through the first conductive base layer 1. It is to be understood that the conduction opening 5 is set to penetrate through the first conductive base layer 1 so that the conduction member 6 in liquid form is easily poured into the conduction opening 5 from a top along a side of the electrochromic device close to the conduction opening 5 and the electrical connection between the conduction member 6 and the first transparent conductive layer 11 and the electrical connection between the conduction member 6 and the second conductive region 312 are more stable.

Figure 3:
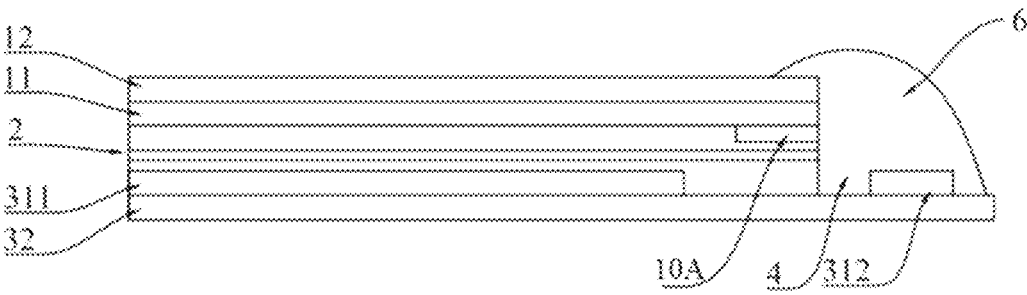
FIG. 3 is a structure diagram of an electrochromic device according to Embodiment 2.

Optionally, as shown in FIG. 3, at least a portion of a surface of a top side of the conduction member 6 overflows the conduction opening 5 and covers at least a portion of a surface of the first conductive base layer 1 away from the electrochromic layer 2.

It is to be explained and noted that in an embodiment shown in FIG. 3, since at least a portion of the surface of the top side of the conduction member 6 overflows the conduction opening 5 and covers at least a portion of the surface of the first conductive base layer 1 away from the electrochromic layer 2, end surfaces of the conduction member 6 and the first substrate layer 12 are not prone to cracking, so as to avoid a failure in the electrical connection between the first transparent conductive layer 11 and the second conductive region 312 with a better bonding effect and an improved production yield.

Figure 2:
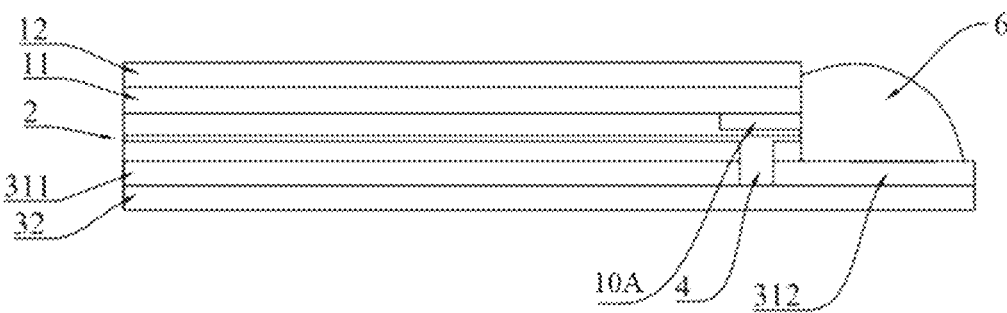
FIG. 2 is a structure diagram of an electrochromic device according to Embodiment 1.

Optionally, as shown in FIGS. 2 and 3, at least a portion of the surface of the peripheral side of the conduction member 6 is not in close proximity to the electrochromic layer 2.

It is to be understood that in embodiments shown in FIGS. 2 and 3, at least a portion of the surface of the peripheral side of the conduction member 6 is not in close proximity to the electrochromic layer 2. When the conduction opening 5 is formed, for embodiment, a first conductive base layer 1 corresponding to a region of the conduction opening 5 can be removed through laser cutting, and a material of the electrochromic layer 2 in the conduction opening 5 can be removed through wiping. As shown in FIGS. 2 and 3, a right side of the conduction opening 5 is not blocked by a material or the like. In this manner, when the first conductive base layer 1 and the electrochromic layer 2 are removed, the process is easier to achieve, thereby significantly improving the product yield. For the structures of FIGS. 2 and 3, the conduction member 6 covers a sidewall on a left side of the conduction opening 5 and is attached to sides of the first conductive base layer 1 and the electrochromic layer 2 so that the first transparent conductive layer 11 is electrically connected to the second conductive region 312. As a preferred solution, to prevent the conduction member 6 from cracking from the sides of the first conductive base layer 1 and the electrochromic layer 2, a top of the conduction member 6 covers a surface of the first conductive base layer 1, thereby enhancing the stability of the connection between the conduction member 6 and the sides of the first conductive base layer 1 and the electrochromic layer 2, ensuring the reliability of the first transparent conductive layer 11 being electrically connected to the second conductive region 312, avoiding a failure of the product due to an open circuit and significantly improving the product yield.

Figure 5:
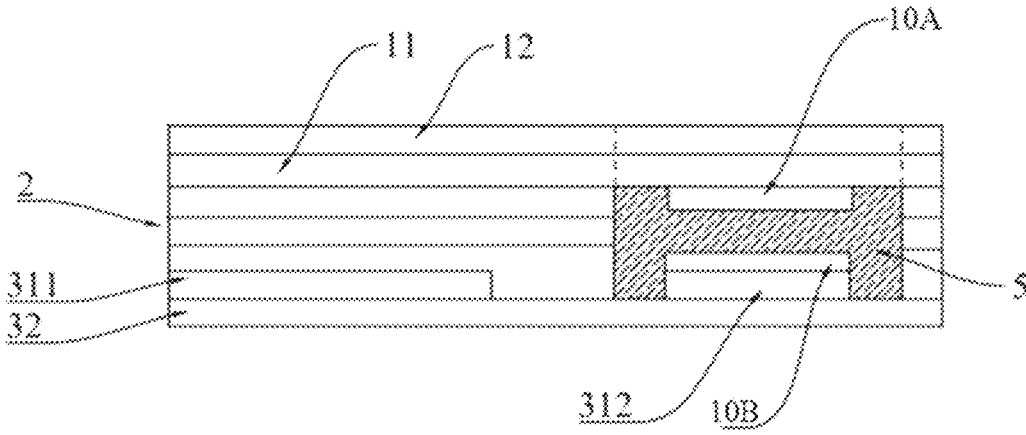
FIG. 5 is a structure diagram of an electrochromic device according to Embodiment 4.

Optionally, as shown in FIG. 5, the top side of the conduction member 6 covers below the first conductive base layer 1. In an embodiment shown in FIG. 5, at least two adjacent sides of a first conductive base layer 1 corresponding to a top side of the conduction opening 5 are etched, the etched first conductive base layer 1 is lifted or taken out, the conduction member 6 is spot-coated in the conduction opening 5 with a needle, and the first conductive base layer 1 is fixed at an original position. In this manner, a contact area between the conduction member 6 and a first busbar 10A is greater, thereby significantly improving a conduction yield.

Optionally, as shown in FIGS. 1 to 5, the conduction structure of the electrochromic device further includes a first busbar 10A, the first busbar 10A is disposed on a surface and/or an interior of the first transparent conductive layer 11 and connected to the conduction member 6.

It is to be understood that since the first busbar 10A is disposed on the surface and/or the interior of the first transparent conductive layer 11 and connected to the conduction member 6, the disposition of the first busbar 10A is conducive to quickly transmitting electrons from the conduction member 6 to the entire first transparent conducive layer 11 and improving a conductive rate and a color-changing speed.

It is to be added that a second busbar 10B may be disposed on the first conductive region 311 and the second conductive region 312, and the conductive performance is further improved on the basis that the first conductive region 311 and the second conductive region 312 are conductive, thereby further improving the conduction yield.

Optionally, the electrochromic layer 2 includes an electrochromic material layer, an electrolyte layer and an ion storage layer which are stacked. Materials of the electrochromic material layer, the electrolyte layer and the ion storage layer may be materials in the prior art, which are not specially limited in the present application.

Optionally, a first substrate 111 (a first water-oxygen barrier layer) is disposed on a side of the first substrate layer 12 away from the electrochromic layer 2, and a second substrate 112 (a second water-oxygen barrier layer) is disposed on a side of the second substrate layer 32 away from the electrochromic layer 2. It is to be understood that the water-oxygen barrier layers used on one sides of the first substrate layer 12 and the second substrate layer 32 can better isolate external water vapor and oxygen and preventing the water vapor and the oxygen from entering the electrochromic layer 2 to affect a normal working of the electrochromic layer 2.

Figure 6:
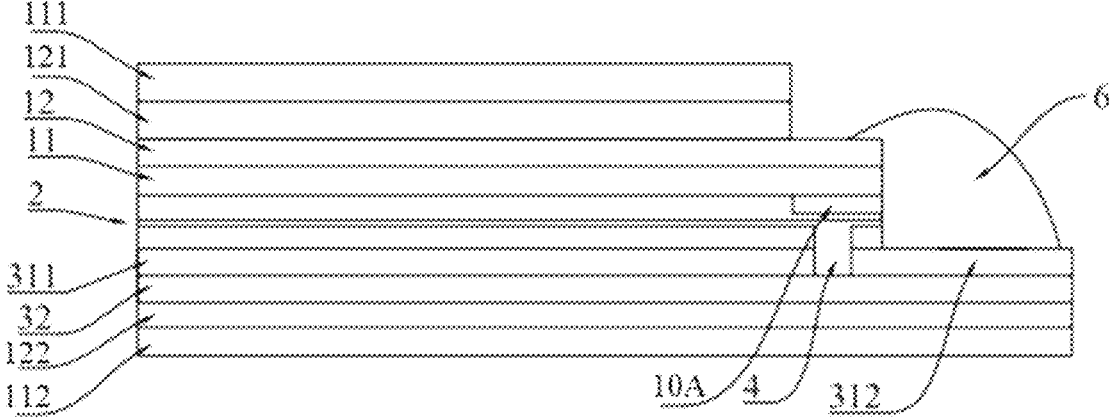
FIG. 6 is a structure diagram of an electrochromic device according to Embodiment 5.

Advantageously, as shown in FIG. 6, the electrochromic device further includes an optical adhesive layer (a first optical adhesive layer 121 and a second optical adhesive layer 122) bonded to the side of the first substrate layer 12 and/or the second substrate layer 32 away from the electrochromic layer 2. It is to be understood that the optical adhesive layer can effectively connect the water-oxygen barrier layer to the first substrate layer 12 and/or the second substrate layer 32 with firm and stable connection and good bonding strength.

A detailed description is given below in conjunction with FIGS. 2 to 6.

Embodiment 1

An electrochromic device, whose structure diagram is shown in FIG. 2, includes a first conductive base layer 1, an electrochromic layer 2 and a second conductive base layer 3 which are stacked in sequence. The first conductive base layer 1 includes a first transparent conductive layer 11 and a first substrate layer 12 which are stacked in sequence, and the first transparent conductive layer 11 is connected to one side of the electrochromic layer 2. The second conductive base layer 3 includes a second transparent conductive layer 31 and a second substrate layer 32 which are stacked in sequence, and the second transparent conductive layer 31 is connected to the other side of the electrochromic layer 2. A partition groove 4 is disposed in the second transparent conductive layer 31 to divide the second transparent conductive layer 31 into a first conductive region 311 and a second conductive region 312 which are independent of each other. At least a portion of the electrochromic layer 2 corresponding to the second conductive region 312 is removed to form a conduction opening 5 which is set to be opened, a conduction member 6 having conductivity is poured into the conduction opening 5, and the conduction member 6 is used for electrically connecting the first transparent conductive layer 11 to the second conductive region 312. A surface of the first conductive region 311 close to one side of the partition groove 4 is covered by the electrochromic layer 2, a portion of a surface of a peripheral side of the conduction member 6 is in close proximity to the electrochromic layer 2, a portion of the surface of the peripheral side of the conduction member 6 is not in close proximity to the electrochromic layer 2, and the conduction opening 5 penetrated through the first conductive base layer 1.

Embodiment 2

An electrochromic device, whose structure diagram is shown in FIG. 3, differs from Embodiment 1 only in that at least a portion of a surface of a top side of the conduction member 6 overflows the conduction opening 5 and covers at least a portion of a surface of the first conductive base layer 1 away from the electrochromic layer 2.

Embodiment 3

Figure 4:
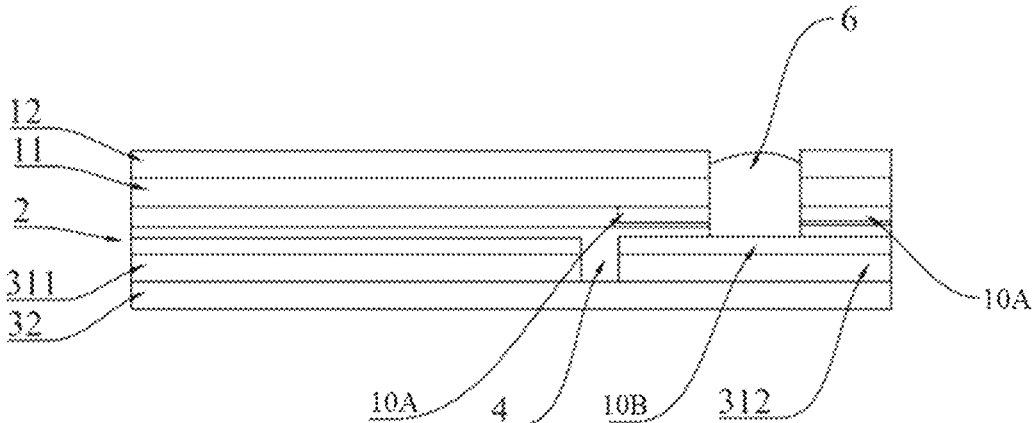
FIG. 4 is a structure diagram of an electrochromic device according to Embodiment 3.

An electrochromic device, whose structure diagram is shown in FIG. 4, differs from Embodiment 1 only in that the conduction opening 5 is a receiving groove with an opening facing upwards and all surfaces of the peripheral side of the conduction member 6 are in close proximity to the electrochromic layer 2.

Embodiment 4

An electrochromic device, whose structure diagram is shown in FIG. 5, differs from Embodiment 1 only in that the conduction opening 5 is a closed receiving cavity, all surfaces of the peripheral side of the conduction member 6 are in close proximity to the electrochromic layer 2 and a top side of the conduction member 6 covers below the first conductive base layer 1.

Embodiment 5

An electrochromic device, whose structure diagram is shown in FIG. 6, differs from Embodiment 1 only in that a first substrate (a water-oxygen barrier layer) 111 is bonded to a side of the first substrate layer 12 away from the electrochromic layer 2 through a first optical adhesive layer 121 and a second substrate (a water-oxygen barrier layer) 112 is bonded to a side of the second substrate layer 32 away from the electrochromic layer 2 through a second optical adhesive layer 122, where widths of the first substrate 111 and the first optical adhesive layer 121 are less than that of the first substrate layer 12 so that a top of the conduction member 6 can cover a surface of the first substrate layer 12, thereby enhancing the stability of the connection between the conduction member 6 and sides of the first conductive base layer 1 and the electrochromic layer 2, ensuring the reliability of the first transparent conductive layer 11 being electrically connected to the second conductive region 312, avoiding a failure of the product due to an open circuit and significantly improving a product yield.

In a manufacturing process of the electrochromic device, the first substrate 111 and the first optical adhesive layer 121 may be pre-fit snugly to each other at a certain distance from a side of the first substrate layer 12, so as to provide a certain area of a surface of the first substrate layer 12 for the attachment of the conduction member 6; the first optical adhesive layer 121 and the first substrate 111, whose widths are each the same as that of the first substrate layer 12, may also be fit snugly around each other, and a small section of the first substrate 111 and the first optical adhesive layer 121 may be cut off along a side of the first substrate layer 12 to form an exposed surface of the first substrate layer 12 shown in FIG. 6 for the attachment of the conduction member 6.

Embodiment 6

Figure 7:
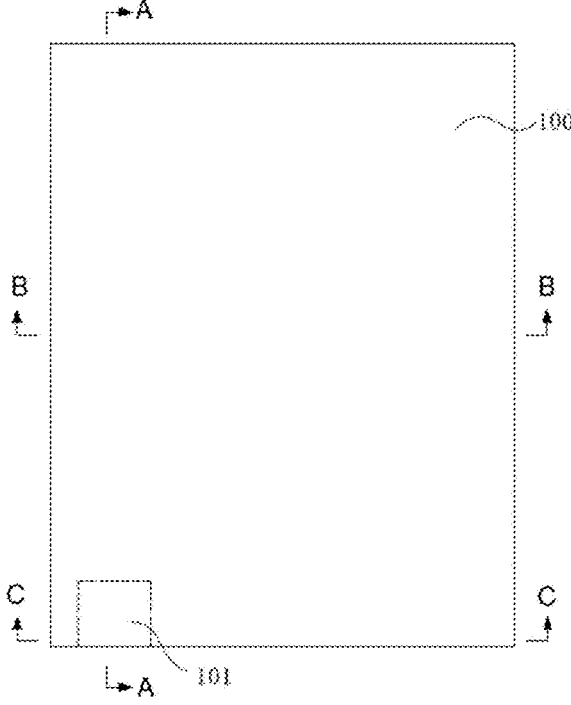
FIG. 7 is a top view of an electrochromic device according to Embodiments 6 to 10.

A top view of an electrochromic device is shown in FIG. 7. An electrochromic device 100 includes an electrode leading out region 101.

Figure 8:
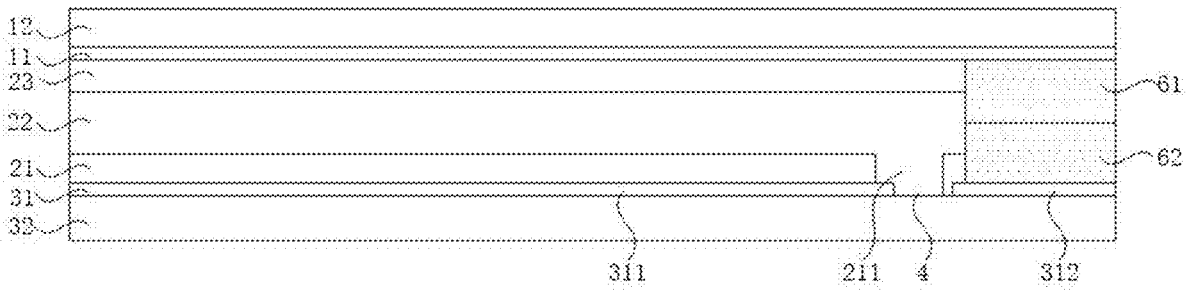
FIG. 8 is a structure diagram of an A-A section of an electrochromic device according to Embodiment 6.

The electrochromic device, whose structure diagram of an A-A section is shown in FIG. 8, includes a second substrate layer 32, a second transparent conductive layer 31, an electrochromic layer 2, a first transparent conductive layer 11 and a first substrate layer 12 which are stacked in sequence. The electrochromic layer 2 includes an electrochromic material layer 21, an electrolyte layer 22 and an ion storage layer 23 which are stacked in sequence, and the electrochromic material layer 21 is disposed on a side close to the second transparent conductive layer 31. The second transparent conductive layer 31 is made of a conductive material ITO, and a partition groove 4 (with a width of 0.1 mm) is disposed thereon so that the second transparent conductive layer 31 is divided into a first conductive region 311 and a second conductive region 312 which are independent of each other.

In the electrode leading out region 101 of the electrochromic device, a second conduction body 62 is disposed on a side of the second conductive region 312 away from the second substrate layer 32, a first conduction body 61 is disposed on a side of the first transparent conductive layer 11 away from the first substrate layer 12, and the first conduction body 61 and the second conduction body 62 are docked to form a conduction member, where surface roughness of the first conduction body 61 is 3 μm, and surface roughness of the second conduction body 62 is 3 μm. The first conductive region 311 is connected to a first leading out electrode (not shown in figure), and the second conductive region 312 is connected to a second leading out electrode (not shown in figure). At least a portion of a side of the conduction member (the first conduction body 61 and the second conduction body 62) is in contact with the electrochromic layer. A second partition region 211 is disposed in the electrochromic material layer 21. In a manufacturing process, the electrochromic material layer 21 is coated on a surface of the second transparent conductive layer 31 to form a first laminate, and the second partition region 211 (with a width of 0.2 mm) is disposed in a side of the electrochromic material layer 21 away from the second transparent conductive layer 31, where a projection of the second partition region 211 on the second transparent conductive layer 31 partially coincides with and partially does not coincide with the partition groove 4. A second laminate is manufactured. The second laminate includes a first substrate layer 12, a first transparent conductive layer 11 and an ion storage layer 23 which are stacked in sequence.

An electrolyte material is added between the first laminate and the second laminate, the first laminate and the second laminate are docked and laminated, and the second partition region 211 is filled with the same electrolyte material as that of the electrolyte layer 22 so that the electrolyte layer 22 is in contact with the partition groove 4 through the electrolyte material in the second partition region 211.

The electrochromic layer has a thickness of 50 μm, the first conduction body has a thickness of 25 μm, and the second conduction body has a thickness of 25 μm. Both the first substrate layer and the second substrate layer are flexible PET layers.

In the electrochromic device of this embodiment, the partition groove is disposed in the second transparent conductive layer to divide the second transparent conductive layer into two regions which are separated from each other and not electrically connected to each other. The first leading out electrode is led out from the first conductive region, and the second leading out electrode is led out from the second conductive region so that both the first leading out electrode and the second leading out electrode are led out from the second transparent conductive layer of the electrochromic device. During welding, a flexible circuit board which integrates two leading out lines may be used, and thermocompression is performed once on one side of the first conductive layer of the electrochromic device so that the welding and leading out of the first leading out electrode and the second leading out electrode can be achieved through thermocompression once. The production process is significantly simplified, the production efficiency is improved, and it is conducive to improving a product yield. To avoid an occurrence of a micro-short circuit inside the electrochromic device, the second partition region is further disposed in the electrochromic layer, thereby preventing a conductive substance or conductive particles in the electrochromic layer from filling the partition groove and resulting in a partition failure of the partition groove. The first conduction body and the second conduction body are predisposed, and when the first laminate and the second laminate are docked, the first conduction body and the second conduction body can be docked so that it is very convenient to tightly connect the first transparent conductive layer to the second conductive region, thereby ensuring that the second electrode led out from the second conductive region of the second transparent conductive layer can well supply power to the first transparent conductive layer. The process is simple and convenient, and the production capacity is significantly improved. The surface roughness of the first conduction body and the second conduction body is adjusted so that contact points of docking surfaces of the first conduction body and the second conduction body are increased, thereby improving the tightness of contact of the first conduction body and the second conduction body and ensuring the effectiveness of the electrical connection between the first conduction body and the second conduction body.

Embodiment 7

A top view of an electrochromic device is shown in FIG. 7. An electrochromic device 100 includes an electrode leading out region 101.

Figure 9:
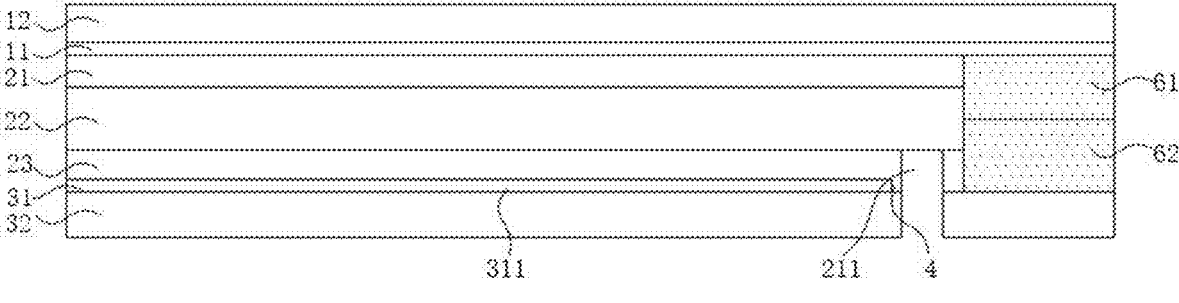
FIG. 9 is a structure diagram of an A-A section of an electrochromic device according to Embodiment 7.

The electrochromic device, whose structure diagram of an A-A section is shown in FIG. 9, includes a second substrate layer 32, a second transparent conductive layer 31, an electrochromic layer, a first transparent conductive layer 11 and a first substrate layer 12 which are stacked in sequence. The electrochromic layer includes an ion storage layer 23, an electrolyte layer 22 and an electrochromic material layer 21 which are stacked in sequence, and the ion storage layer 23 is disposed on a side close to the second transparent conductive layer 31. The second transparent conductive layer 31 is made of a conductive material ITO, and a partition groove 4 is disposed thereon so that the second transparent conductive layer 31 is divided into a first conductive region 311 and a second conductive region 312 which are independent of each other. In this embodiment, the second conductive region 312 coincided with the partition groove 4.

In the electrode leading out region 101 of the electrochromic device, a second conduction body 62 is disposed on a side of the second conductive region 312 away from the second substrate layer 32, a first conduction body 61 is disposed on a side of the first transparent conductive layer 11 away from the first substrate layer 12, and the first conduction body 61 and the second conduction body 62 are docked to form a conduction member, where surface roughness of the first conduction body 61 is 4 μm, and surface roughness of the second conduction body 62 is 4 μm. The first conductive region 311 is connected to a first leading out electrode (not shown in figure), and the second conductive region 312 is connected to a second leading out electrode (not shown in figure). At least a portion of a side of the conduction member (the first conduction body 61 and the second conduction body 62) is in contact with the electrochromic layer. A second partition region 211 is disposed in the ion storage layer 23. In a manufacturing process, the ion storage layer 23 is coated on a surface of the second transparent conductive layer 31 to form a first laminate, the electrochromic material layer 21 is coated on a surface of the first transparent conductive layer 11 to form a second laminate, an electrolyte material is added between the first laminate and the second laminate, and the first laminate and the second laminate are docked and laminated; the second partition region 221 is disposed on a side of the second substrate layer 32 away from the ion storage layer 23 and penetrated through the second substrate layer 32, the second transparent conductive layer 31 and the ion storage layer 23, where the second partition region 221 has a width of 0.2 mm, and a projection of the second partition region 221 on the second transparent conductive layer 31 completely fell into the partition groove 4. No substance is filled in the second partition region 221.

The electrochromic layer has a thickness of 40 μm, the first conduction body has a thickness of 20 μm, and the second conduction body has a thickness of 20 μm. A material used for the first substrate layer is ITO glass, and a material used for the second substrate layer is flexible PET.

In the electrochromic device of this embodiment, the partition groove is disposed in the second transparent conductive layer to divide the second transparent conductive layer into two regions which are separated from each other and not electrically connected to each other. The first leading out electrode is led out from the first conductive region, and the second leading out electrode is led out from the second conductive region so that both the first leading out electrode and the second leading out electrode are led out from the second transparent conductive layer of the electrochromic device. During welding, a flexible circuit board which integrates two leading out lines may be used, and thermocompression is performed once on one side of the first conductive layer of the electrochromic device so that the welding and leading out of the first leading out electrode and the second leading out electrode can be achieved through thermocompression once. The production process is significantly simplified, the production efficiency is improved, and it is conducive to improving a product yield. Further, the second partition region is disposed in the ion storage layer with convenient processing and high production efficiency. The first conduction body and the second conduction body are predisposed, and when the first laminate and the second laminate are docked, the first conduction body and the second conduction body can be docked so that it is very convenient to tightly connect the first transparent conductive layer to the second conductive region, thereby ensuring that the second electrode led out from the second conductive region of the second transparent conductive layer can well supply power to the first transparent conductive layer. The process is simple and convenient, and the production capacity is significantly improved. The surface roughness of the first conduction body and the second conduction body is adjusted so that contact points of docking surfaces of the first conduction body and the second conduction body are increased, thereby improving the tightness of contact of the first conduction body and the second conduction body and ensuring the effectiveness of the electrical connection between the first conduction body and the second conduction body.

Optionally, in alternative embodiments of this embodiment, on the basis of penetrating through the second substrate layer 32, the second transparent conductive layer 31 and the ion storage layer 23, the second partition region 211 may further longitudinally penetrate through a portion or all of the electrolyte layer 22, or further longitudinally penetrate through the electrolyte layer 22 and a portion or all of the electrochromic material layer 21.

Embodiment 8

Figure 10:
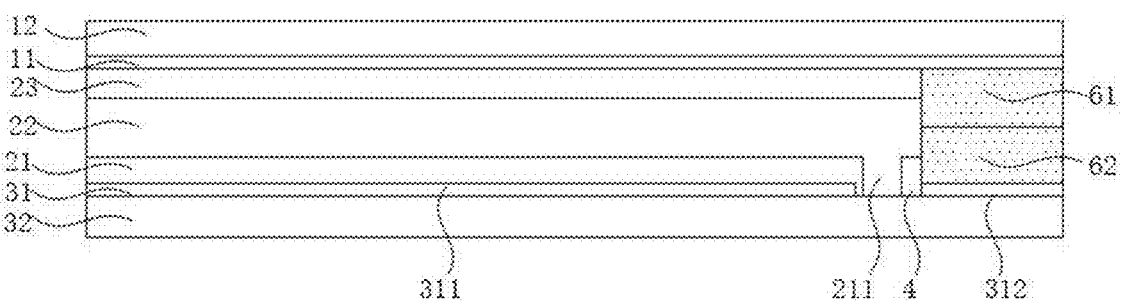
FIG. 10 is a structure diagram of an A-A section of an electrochromic device according to Embodiment 8.

A top view of an electrochromic device is shown in FIG. 7. An electrochromic device 100 includes an electrode leading out region 101. The electrochromic device, whose structure diagram of an A-A section is shown in FIG. 10, differs from Embodiment 6 only in that the projection of the second partition region 211 on the second transparent conductive layer 31 completely fell into the partition groove 4. The surface roughness of the first conduction body 61 is 4 μm, and the surface roughness of the second conduction body 62 is 3 μm. The electrochromic layer has a thickness of 30 μm, the first conduction body 61 has a thickness of 15 μm, and the second conduction body 62 has a thickness of 15 μm.

The electrochromic device of this embodiment has the same beneficial effect as that of Embodiment 6.

Embodiment 9

Figure 11:
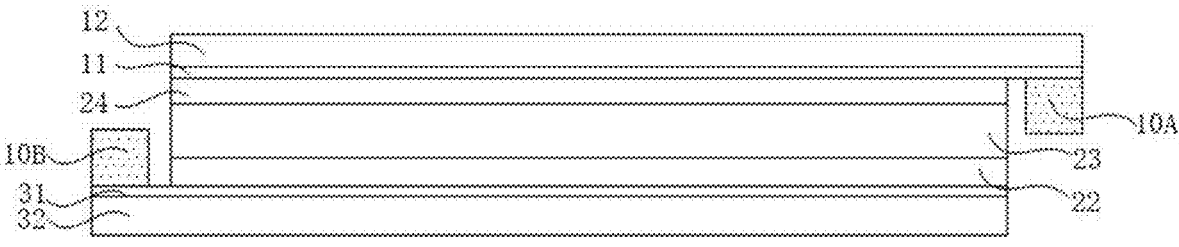
FIG. 11 is a structure diagram of a B-B section of an electrochromic device according to Embodiment 9.
Figure 12:
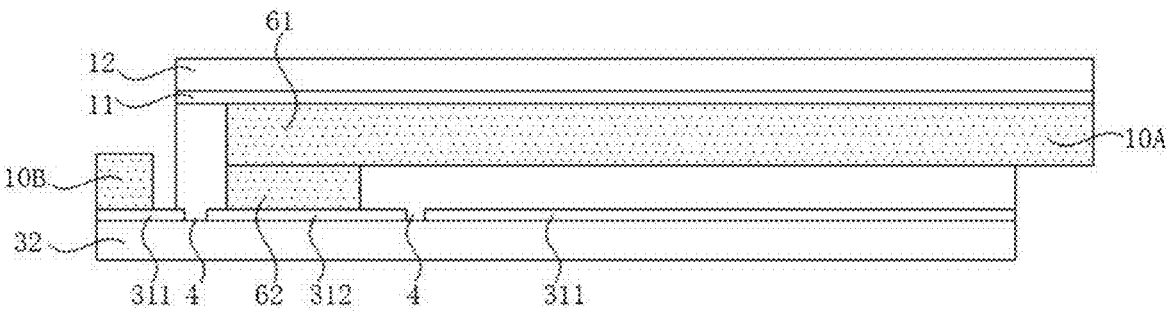
FIG. 12 is a structure diagram of a C-C section of an electrochromic device according to Embodiment 9.

A top view of an electrochromic device is shown in FIG. 7. An electrochromic device 100 includes an electrode leading out region 101. The electrochromic device, whose structure diagrams of a B-B section and a C-C section are shown in FIGS. 11 and 12, respectively, differs from Embodiment 8 only in that a first busbar 10A is disposed on the first transparent conductive layer 11 and a second busbar 10B is disposed on the second transparent conductive layer 31, where the first conduction body 61 is a terminal of the first busbar 10A. A projection of the second busbar 10B on the first transparent conductive layer 11 does not coincide with a projection of the first busbar 10A on the first transparent conductive layer 11.

In the electrochromic device of this embodiment, on the basis of the beneficial effect of Embodiment 8, the first busbar and the second busbar are further disposed to improve the uniformity of the voltage distribution of the first transparent conductive layer and the second transparent conductive layer, thereby improving the color-changing speed and color-changing uniformity of the electrochromic device. The first conduction body is regarded as a portion of the first busbar. In this manner, the first conduction body does not need to be separately disposed, and when the first busbar is made, the first conduction body can be made. The processing steps are simplified, and the production capacity is improved. In addition, the distribution of the first busbar and the second busbar on a plane surface is further adjusted so that the first busbar is not in contact with the second busbar up and down, avoiding a short circuit failure of the electrochromic device. In this embodiment, the color-changing speed, color-changing uniformity and product reliability of the electrochromic device are significantly improved.

Embodiment 10

Figure 13:
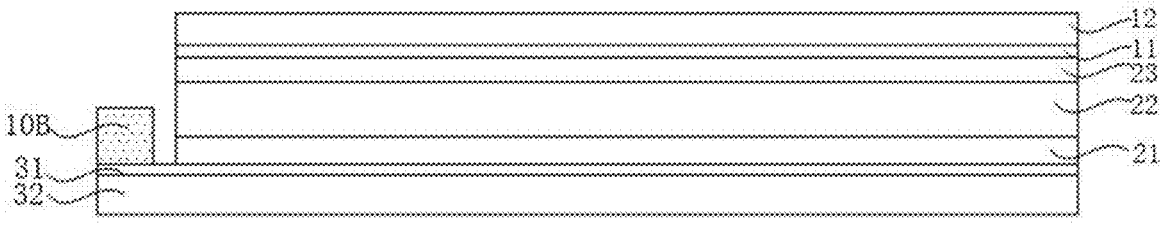
FIG. 13 is a structure diagram of a B-B section of an electrochromic device according to Embodiment 10.
Figure 14:
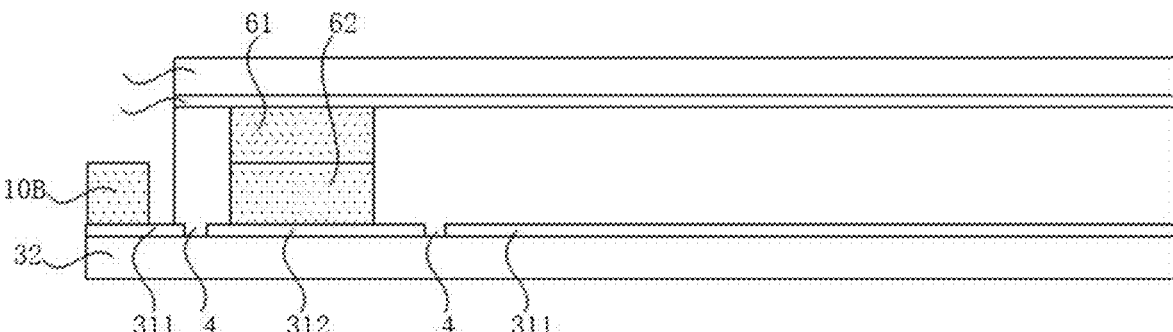
FIG. 14 is a structure diagram of a C-C section of an electrochromic device according to Embodiment 10.

A top view of an electrochromic device is shown in FIG. 7. An electrochromic device 100 includes an electrode leading out region 101. The electrochromic device, whose structure diagrams of a B-B section and a C-C section are shown in FIGS. 13 and 14, respectively, differs from Embodiment 6 only in that a surface resistance of the second transparent conductive layer 31 is greater than a surface resistance of the first transparent conductive layer 11, where the surface resistance of the second transparent conductive layer 31 is 90Ω, the surface resistance of the first transparent conductive layer 11 is 45Ω, a second busbar 10B is disposed on the second transparent conductive layer 31, and the second busbar 10B is not in contact with the electrochromic layer. In this embodiment, since the surface resistance of the first transparent conductive layer 11 is relatively small, no busbar is disposed thereon. The second busbar 10B is disposed along a periphery of the first conductive region 311 and not disposed at a periphery of the first conductive region 311 adjacent to the second conductive region 312. The electrochromic material layer 21 is located on the side close to the second transparent conductive layer 31, and the second partition region 211 is disposed in the electrochromic material layer 21.

In the electrochromic device of this embodiment, on the basis of the beneficial effect of Embodiment 6, the second transparent conductive layer having a relatively large surface resistance and the first transparent conductive layer having a relatively small surface resistance are further matched, where the second transparent conductive layer having a relatively large surface resistance has higher light transmittance, and the first transparent conductive layer having a relatively small surface resistance has a faster conductive speed, so that in a synergistic manner, the electrochromic device clearly displays a color of the electrochromic layer and an effect of quick and uniform color-changing is achieved. Moreover, the second busbar is disposed on the second transparent conductive layer to improve the uniformity of the voltage distribution of the second transparent conductive layer, thereby further improving the color-changing speed and color-changing uniformity of the electrochromic device. Since the second transparent conductive layer has higher light transmittance and the color of the electrochromic device is mainly displayed by the electrochromic material layer, in this embodiment, the electrochromic material layer is further disposed on the side close to the second transparent conductive layer, and when a user views from an outside of the second transparent conductive layer, a display effect of the color of the electrochromic device is better.

Embodiment 11

An electrochromic device differs from Embodiment 10 only in that the ion storage layer is located on the side close to the second transparent conductive layer and the second partition region is disposed on the ion storage layer. The surface resistance of the second transparent conductive layer is 90Ω, and the surface resistance of the first transparent conductive layer is 30Ω.

In the electrochromic device of this embodiment, on the basis of the beneficial effect of Embodiment 6, the second transparent conductive layer having a relatively large surface resistance and the first transparent conductive layer having a relatively small surface resistance are further matched, where the second transparent conductive layer having a relatively large surface resistance has higher light transmittance, and the first transparent conductive layer having a relatively small surface resistance has a faster conductive speed, so that in the synergistic manner, the electrochromic device clearly displays the color of the electrochromic layer and the effect of quick and uniform color-changing is achieved. Moreover, the second busbar is disposed on the second transparent conductive layer to improve the uniformity of the voltage distribution of the second transparent conductive layer, thereby further improving the color-changing speed and color-changing uniformity of the electrochromic device.

Embodiment 12

On the basis of any one of the preceding Embodiments 6 to 11, a first substrate 111, a second substrate 112 and a sealing member 130 may be further disposed.

Figure 15:
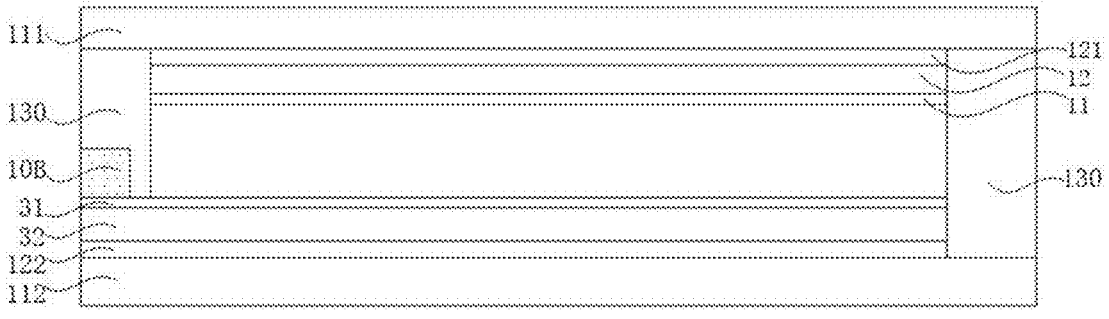
FIG. 15 is a structure diagram of an electrochromic device according to Embodiment 12.

An electrochromic device, whose structure diagram is shown in FIG. 15, differs from Embodiment 11 only in that a side of the first substrate layer 12 away from the first transparent conductive layer 11 is connected to the first substrate 111 through a first optical adhesive layer 121 and a side of the second substrate layer 32 away from the second transparent conductive layer 31 is connected to the second substrate 112 through a second optical adhesive layer 122. The sealing member 130 is disposed along a peripheral side of the electrochromic layer. The sealing member 130 is disposed between the first substrate 111 and the second substrate 112. An edge of at least one side of the first substrate 111 is longer than that of the first substrate layer 12, and an edge of at least one side of the second substrate 112 is longer than that of the second substrate layer 32. A projection of an outer side of the sealing member 130 on the first substrate 111 coincided with an outer periphery of the first substrate 111, and a projection of the outer side of the sealing member 130 on the second substrate 112 coincided with an outer periphery of the second substrate 112.

The first substrate 111 is a flexible water-oxygen barrier film, and the second substrate 112 is glass. A material of the second optical adhesive layer 122 can block ultraviolet light.

In the electrochromic device of this embodiment, on the basis of the beneficial effect of Embodiment 11, the first substrate and the second substrate are further disposed so that the protection of the electrochromic device can be improved, the mechanical structure strength of the electrochromic device can be improved and water and oxygen in an external environment can be further prevented from intruding from the first substrate and affecting a service life of the electrochromic device; moreover, the sealing member is filled between the first substrate and the second substrate and located in a spatial region on the peripheral side of the electrochromic material layer, thereby well achieving a sealing effect, preventing the water and the oxygen from affecting the electrochromic layer and improving the service life of the electrochromic device. In this embodiment, the material of the second optical adhesive layer is further set to be an optical adhesive layer which can block the ultraviolet light so that the aging of a material of a solid-state electrolyte layer can be slowed down and the service life of the electrochromic device can be improved.

Embodiment 13

Figure 16:
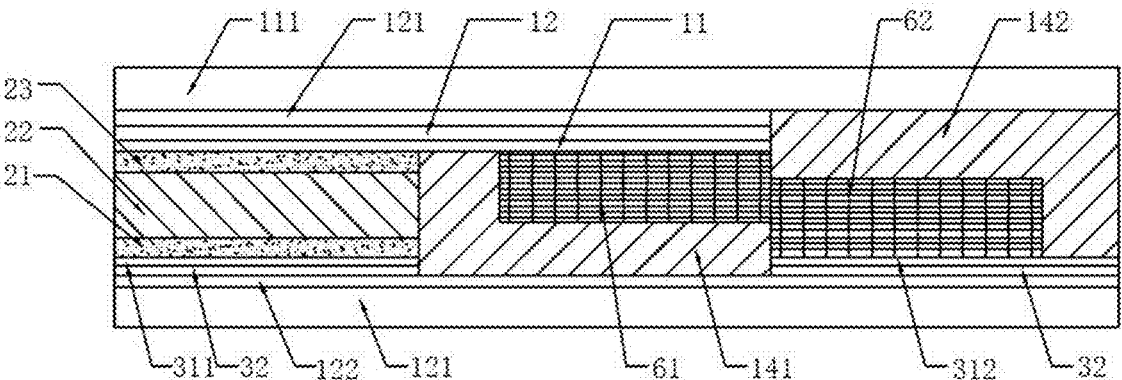
FIG. 16 is a structure diagram of an electrochromic device according to Embodiment 13.

An electrochromic device, whose structure diagram is shown in FIG. 16, includes a first substrate layer 12, a first transparent conductive layer 11, an electrochromic layer, a second transparent conductive layer 31 and a second substrate layer 32 which are stacked in sequence. A first optical adhesive layer 121 and a first substrate 111 are sequentially disposed on a side of the first substrate layer 12 away from the first transparent conductive layer 11, and a second optical adhesive layer 122 and a second substrate 112 are sequentially disposed on a side of the second substrate layer 32 away from the second transparent conductive layer 31. A partition groove 4 is disposed in the second transparent conductive layer 31 to divide the second transparent conductive layer 31 into a first conductive region 311 and a second conductive region 312 which are independent of each other, and the partition groove 4 penetrated through the second substrate layer 32.

A conduction member is used for electrically connecting the first transparent conductive layer 11 to the second conductive region 312. The conduction member includes a first conduction body 61 and a second conduction body 62, where the first conduction body 61 is connected to a side of the first transparent conductive layer 11 away from the first substrate layer 12, and the second conduction body 62 is disposed on a side of the second conductive region 312 away from the second substrate layer 32. A side of the first conduction body 61 is in contact with and connected to a side of the second conduction body 62.

A region between the partition groove 4 and the first transparent conductive layer 11 is a first conduction region, and the first conduction region includes the first conduction body 61 and a first sealant 141, where at least a portion of a surface of the first conduction body 61 is covered with the first sealant 141 so that the first conduction body 61 is not in contact with the electrochromic layer and the second transparent conductive layer 31. A region between the second conductive region 312 and the first substrate 111 is a second conduction region, and the second conduction region includes the second conduction body 62 and a second sealant 142, where at least a portion of a surface of the second conduction body 62 is covered with the second sealant 142. Other spaces in the first conduction region are all filled with the first sealant 141 except a space occupied by the first conduction body 61, and other spaces in the second conduction region are all filled with the second sealant 142 except a space occupied by the second conduction body 62.

An interface between the first conductive region 311 and the first conduction region is denoted as a first interface, and an interface between the first conduction region and the second conduction region is denoted as a second interface. One end surface of the first conduction body 61 is located at the second interface, and a gap is reserved between the other end surface of the first conduction body 61 and the first interface and filled with the first sealant 141. One end surface of the second conduction body 62 is located at the second interface and in contact with one end surface of the first conduction body 61, and a gap is reserved between the other end of the second conduction body 62 and an outer edge of the electrochromic device and filled with the second sealant 142.

At the second interface, one end surface of the second conduction body 62 is in partial surface contact with one end surface of the first conduction body 61. For ease of description, each surface is named: a contact surface between the first conduction body 61 and the first transparent conductive layer 11 is denoted as a first contact surface, and a surface on an opposite side of the first contact surface is denoted as a first surface; similarly, a contact surface between the second conduction body 62 and the second conductive region 312 is denoted as a second contact surface, and a surface on an opposite side of the second contact surface is denoted as a second surface. The first contact surface is higher than the second surface, and an extension surface of the first surface is located between the second surface and the second contact surface, which is equivalent to a thickness of the first conduction body 61 being equivalent to a thickness of the second conduction body 62; a contact side of the first conduction body 61 and a contact side of the second conduction body 62 have mutually staggered regions, and the first conduction body 61 is higher than the second conduction body 62 as a whole.

The electrochromic layer includes an ion storage layer 23, an electrolyte layer 22 and an electrochromic material layer 21 which are stacked in sequence, where the ion storage layer 23 is disposed on a side close to the first transparent conductive layer 11.

The first substrate 111 is a water-oxygen barrier film, the second substrate 112 is an appearance texture film, both materials of the first conduction body 61 and the second conduction body 62 are silver pastes, and both the first substrate layer 12 and the second substrate layer 32 are PET layers.

This embodiment further provides a method for manufacturing the electrochromic device, which specifically includes the steps described below.

(1) An electrochromic stack is manufactured. The electrochromic stack includes a first substrate layer 12, a first transparent conductive layer 11, an electrochromic layer, a second transparent conductive layer 31 and a second substrate layer 32 which are stacked in sequence, where a first optical adhesive layer 121 and a back film are disposed on an outside of the first substrate layer 12.

(2) A second groove is formed through cutting from one side of the first substrate layer 12, where a first substrate layer 12, a first transparent conductive layer 11 and an electrochromic layer in the second groove are all removed.

(3) The second groove is filled with a second conduction body 62, and a surface of the second conduction body 62 is filled with a second sealant 142.

(4) The back film on the outside of the first substrate layer 12 is removed, a first substrate 111 is disposed on an outer surface of the first substrate layer 12, and the second sealant 142 is cured to form a second conduction region.

(5) A partition groove 4 is formed through cutting from one side of the second substrate layer 32, where a second substrate layer 32, a second transparent conductive layer 31 and an electrochromic layer in the partition groove 4 are all removed. The partition groove 4 is disposed to be horizontally adjacent to the second groove, and the partition groove 4 divided the second substrate layer 32 and the second transparent conductive layer 31 into a first conductive region 311 and a second conductive region 312 that are not in contact with each other.

(6) The partition groove 4 is filled with a first conduction body 61, and a surface of the first conduction body 61 is filled with a first sealant 141.

(7) A second optical adhesive layer 122 and a second substrate 112 are sequentially disposed on an outer surface of the second substrate layer 32, and the first sealant 141 is cured to form a first conduction region.

(8) An electrochromic stack close to an outside of the second conduction region is cut off along an edge of the second sealant 141 so that the electrochromic device of the present application is manufactured.

In some other embodiments of the present application, the second conduction region may be manufactured before the first conduction region is manufactured, that is, steps (2) to (4) in this embodiment are exchanged with steps (5) to (7).

Some other embodiments of the present application differ from this embodiment in that in the electrochromic stack manufactured in step (1), the first optical adhesive layer 121 and the back film are not disposed on the outside of the first substrate layer 12 so that an additional adhesive layer needed to be disposed when the first substrate 111 is attached.

Some other embodiments of the present application differ from this embodiment in that in the electrochromic stack manufactured in step (1), the first optical adhesive layer 121 and the back film are disposed on the outside of the first substrate layer 12 and the second optical adhesive layer 122 and the back film are disposed on an outside of the second substrate layer 32 so that no additional adhesive layer needed to be disposed when the first substrate 111 and the second substrate 112 are attached.

Some other embodiments of the present application differ from this embodiment in that in the electrochromic stack manufactured in Embodiment 1, the first optical adhesive layer 121 and the back film are not disposed on the outside of the first substrate layer 12 and the second optical adhesive layer 122 and the back film are disposed on an outside of the second substrate layer 32 so that an additional adhesive layer needed to be disposed when the first substrate 111 is attached.

Embodiment 14

Figure 17:
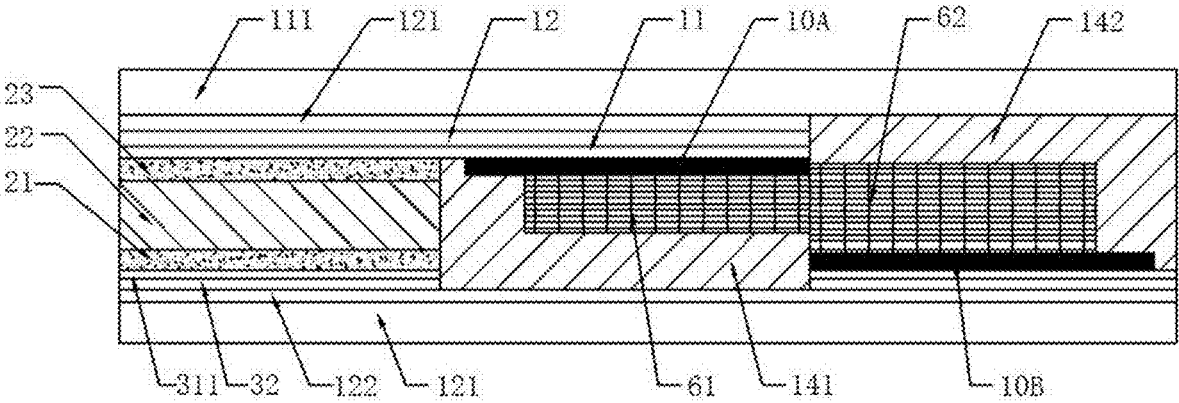
FIG. 17 is a structure diagram of an electrochromic device according to Embodiment 14.

An electrochromic device, whose structure diagram is shown in FIG. 17, differs from Embodiment 13 in that a first busbar 10A is disposed between the first transparent conductive layer 11 and the first conduction body 61, a width of the first busbar 10A is greater than a width of the first conduction body 61 and other spaces in the first conduction region are all filled with the first sealant 141 except a space occupied by the first conduction body 61 and the first busbar 10A.

A second busbar 10B is disposed between the second conductive region 312 and the second conduction body 62, a width of the second busbar 10B is greater than a width of the second conduction body 62, and other spaces in the second conduction region are all filled with the second sealant 142 except a space occupied by the second conduction body 62 and the second busbar 10B.

The interface between the first conductive region 311 and the first conduction region is denoted as the first interface, and the interface between the first conduction region and the second conduction region is denoted as the second interface. One end of the first busbar 10A is aligned with one end surface of the first conduction body 61 and located at the second interface, a gap is reserved between the other end of the first busbar 10A and the first interface, the gap is reserved between the other end surface of the first conduction body 61 and the first interface, a gap width between the first conduction body 61 and the first interface is greater than a gap width between the first busbar 10A and the first interface, and the gap is filled with the first sealant 141. One end surface of the second conduction body 62 is located at the second interface and in contact with one end surface of the first conduction body 61, and the gap is reserved between the other end of the second conduction body 62 and the outer edge of the electrochromic device and filled with the second sealant 142.

At the second interface, one end surface of the second conduction body 62 is in complete surface contact with one end surface of the first conduction body 61. For ease of description, each surface is named: a contact surface between the first conduction body 61 and the first busbar 10A is denoted as a first contact surface, and a surface on an opposite side of the first contact surface is denoted as a first surface; similarly, a contact surface between the second conduction body 62 and the second busbar 10B is denoted as a second contact surface, and a surface on an opposite side of the second contact surface is denoted as a second surface. Both an extension surface of the first contact surface and an extension surface of the first surface are located between the second surface and the second contact surface, which is equivalent to the thickness of the first conduction body 61 being less than the thickness of the second conduction body 62; the contact side of the second conduction body 62 completely covered the contact side of the first conduction body 61.

Embodiment 15

Figure 18:
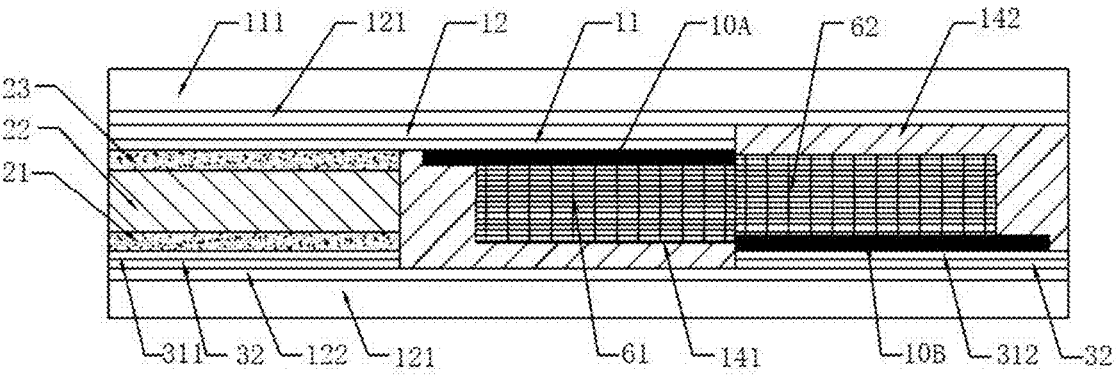
FIG. 18 is a structure diagram of an electrochromic device according to Embodiment 15.

An electrochromic device, whose structure diagram is shown in FIG. 18, differs from Embodiment 14 in that at the second interface, one end surface of the second conduction body 62 is in partial surface contact with one end surface of the first conduction body 61, the extension surface of the first contact surface is located between the second surface and the second contact surface, the first surface is lower than the second contact surface, an extension line of the first surface is located between surfaces on both sides of the second busbar 10B, which is equivalent to the thickness of the first conduction body 61 being equivalent to the thickness of the second conduction body 62, the contact side of the first conduction body 61 and the contact side of the second conduction body 62 are staggered from each other and the first conduction body 61 is lower than the second conduction body 62 as a whole.

Embodiment 16

Figure 19:
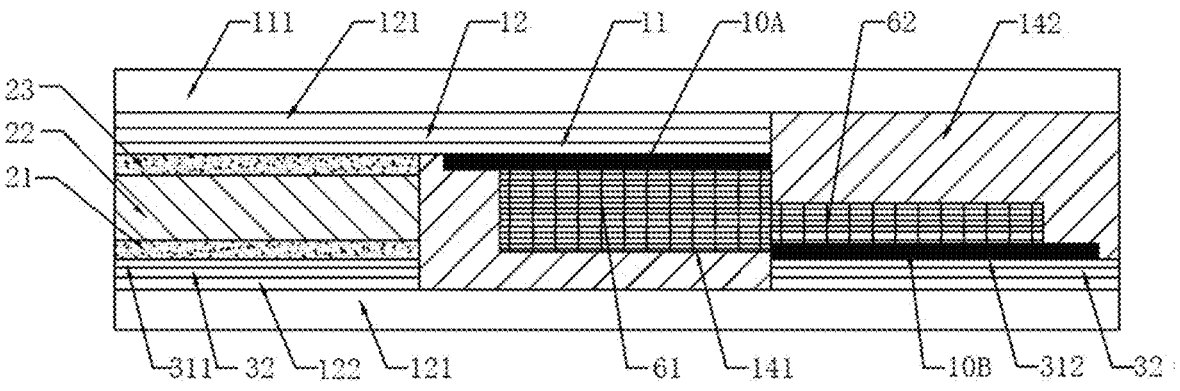
FIG. 19 is a structure diagram of an electrochromic device according to Embodiment 16.

An electrochromic device, whose structure diagram is shown in FIG. 19, differs from Embodiment 14 in that the first contact surface is higher than the second surface, an extension surface of the second surface is located between the first surface and the first contact surface, the extension surface of the first surface is located between surfaces on both sides of the second busbar 10B, which is equivalent to the thickness of the first conduction body 61 being greater than the thickness of the second conduction body 62, and the contact side of the first conduction body 61 completely covered the contact side of the second conduction body 62.

Embodiment 17

Figure 20:
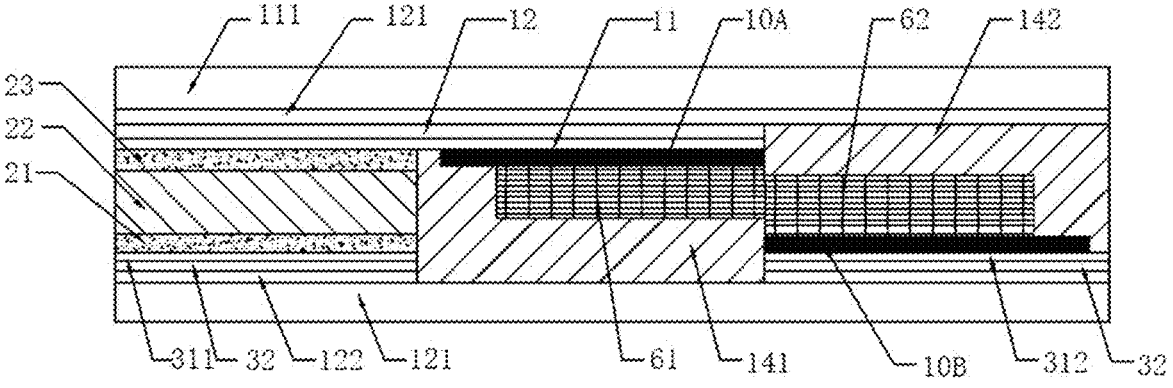
FIG. 20 is a structure diagram of an electrochromic device according to Embodiment 17.

An electrochromic device, whose structure diagram is shown in FIG. 20, differs from Embodiment 14 in that at the second interface, one end surface of the second conduction body 62 is in partial surface contact with one end surface of the first conduction body 61, the first contact surface is higher than the second surface, the extension surface of the first surface is located between the second surface and the second contact surface, which is equivalent to the thickness of the first conduction body 61 being equivalent to the thickness of the second conduction body 62, the contact side of the first conduction body 61 and the contact side of the second conduction body 62 are staggered from each other and the first conduction body 61 is higher than the second conduction body 62 as a whole.

Application Embodiment 1

Figure 21:
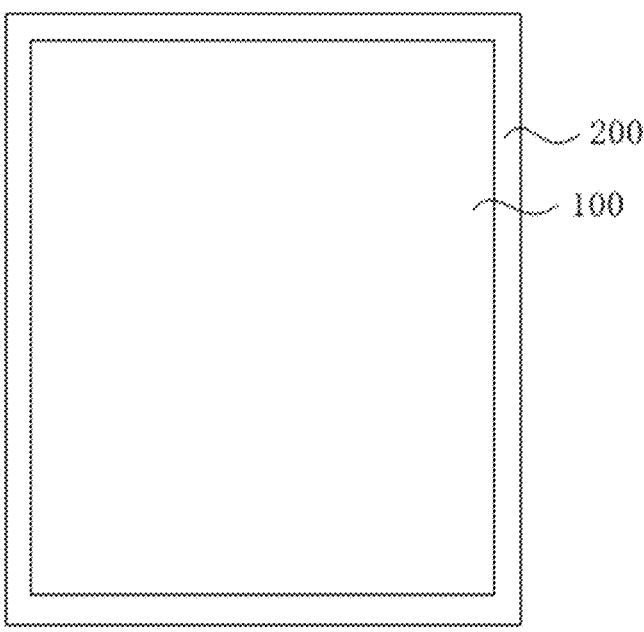
FIG. 21 is a structure diagram of an electronic device according to Application Embodiment 1.

An electronic device 200, whose structure diagram is shown in FIG. 21, includes any one of the electrochromic devices 100 of the preceding Embodiments 1 to 17. The second substrate layer 32 of the electrochromic device 100 is close to a side of the incidence of ambient light.

In this application embodiment, the electronic device including the electrochromic device provided in any one of the preceding embodiments has a low production cost, a simple and convenient production process, high production efficiency, a high product yield and good product stability. When the ambient light is incident from only one side of the electrochromic device 100, the second substrate layer is disposed close to the side of the incidence of the ambient light so that the surface resistance of the second transparent conductive layer close to one side of the second substrate layer and a material and thickness of the electrochromic material layer are adjusted and the electronic device has a better display effect of a color and effects of quick color-changing and uniform color-changing.

What is claimed is:

1. An electrochromic device, comprising:
   a first conductive base layer, an electrochromic layer and a second conductive base layer which are stacked in sequence;
   wherein the first conductive base layer comprises a first transparent conductive layer and a first substrate layer which are stacked in sequence, and the first transparent conductive layer is bonded to one side of the electrochromic layer;
   wherein the second conductive base layer comprises a second transparent conductive layer and a second substrate layer which are stacked in sequence, and the second transparent conductive layer is bonded to the other side of the electrochromic layer;
   a partition groove is disposed in the second transparent conductive layer to divide the second transparent conductive layer into a first conductive region and a second conductive region which are independent of each other; and
   a conduction member is disposed on the second conductive region, and the first transparent conductive layer is electrically connected to the second conductive region through the conduction member, wherein a top side of the conduction member covers below the first conductive base layer.

2. The electrochromic device according to claim 1, wherein at least a surface of the first conductive region close to one side of the partition groove is covered by the electrochromic layer.

3. The electrochromic device according to claim 1, wherein at least a portion of a surface of a peripheral side of the conduction member is in close proximity to the electrochromic layer.

4. The electrochromic device according to claim 1, wherein the electrochromic device further comprises a first busbar, wherein the first busbar is disposed on a surface and/or an interior of the first transparent conductive layer and connected to the conduction member.

5. The electrochromic device according to claim 1, wherein the conduction member comprises a first conduction body and a second conduction body which are connected to each other, wherein the first conduction body is connected to a side of the first transparent conductive layer away from the first substrate layer, and the second conduction body is disposed on a side of the second conductive region away from the second substrate layer.

6. The electrochromic device according to claim 5, wherein a first substrate is disposed on a side of the first substrate layer away from the first transparent conductive layer, and a second substrate is disposed on a side of the second substrate layer away from the second transparent conductive layer; the partition groove penetrates through the second substrate layer; a side of the first conduction body is in contact with and connected to a side of the second conduction body;
   a region between the partition groove and the first transparent conductive layer is a first conduction region, and the first conduction region comprises a first conduction body and a first sealant; at least a portion of a surface of the first conduction body is covered with the first sealant so that the first conduction body is not in contact with the electrochromic layer and the second transparent conductive layer; and
   a region between the second conductive region and the first substrate is a second conduction region, and the second conduction region comprises a second conduction body and a second sealant; at least a portion of a surface of the second conduction body is covered with the second sealant.

7. The electrochromic device according to claim 6, wherein a first busbar is disposed between the first conduction body and the first transparent conductive layer,
   a gap width between the first conduction body and the electrochromic layer is greater than a gap width between the first busbar and the electrochromic layer,
   other spaces in the first conduction region are all filled with the first sealant except a space occupied by the first conduction body and the first busbar.

8. The electrochromic device according to claim 6, a second busbar is disposed between the second conductive region and the second conduction body,
   a width of the second busbar is greater than a width of the second conduction body,
   other spaces in the second conduction region are all filled with the second sealant except a space occupied by the second conduction body and the second busbar.

9. The electrochromic device according to claim 6, wherein an interface between the first conduction region and the first conductive region is denoted as a first interface, and an interface between the first conduction region and the second conduction region is denoted as a second interface; wherein
   one end surface of the first conduction body is in surface contact with one end surface of the second conduction body at the second interface, a gap is reserved between the other end surface of the first conduction body and the first interface and filled with the first sealant, and a gap is reserved between the other end of the second conduction body and an outer edge of the electrochromic device and filled with the second sealant.

10. The electrochromic device according to claim 6, a first optical adhesive layer is disposed between the first substrate and the first substrate layer, and a second optical adhesive layer is disposed between the second substrate and the second substrate layer.

11. The electrochromic device according to claim 1, wherein the first substrate layer and/or the second substrate layer are/is a flexible substrate layer.

12. An electrochromic device, comprising a first substrate layer, a first transparent conductive layer, an electrochromic layer, a second transparent conductive layer and a second substrate layer which are stacked in sequence;

wherein the second transparent conductive layer comprises a conductive material, the second transparent conductive layer comprises a first conductive region and a second conductive region, and a partition groove is disposed in the second transparent conductive layer which divides the second transparent conductive layer into a first conductive region and a second conductive region which are independent of each other;

wherein a first conduction body is disposed on a surface of the second conductive region away from the first substrate layer, a second conduction body is disposed on a surface of the first transparent conductive layer away from the second substrate layer, wherein the first conduction body and the second conduction body are docked;

wherein the first conductive region is connected to a first leading out electrode, and the second conductive region is connected to a second leading out electrode;

and a second partition region is disposed in the electrochromic layer, wherein a projection of the second partition region on the second transparent conductive layer at least partially coincides with the partition groove.

13. The electrochromic device according to claim 12, wherein the electrochromic layer comprises an electrochromic material layer, an electrolyte layer and an ion storage layer which are stacked in sequence;

wherein at least a portion of sides of the first conduction body and the second conduction body is in contact with the electrochromic layer; wherein the electrochromic material layer is located on a side close to the second transparent conductive layer, the second partition region is disposed in the electrochromic material layer, and divides the electrochromic material layer into two regions which are not connected to each other; or, the ion storage layer is located on a side close to the second transparent conductive layer, the second partition region is disposed in the ion storage layer, and divides the ion storage layer into two regions which are not connected to each other.

14. The electrochromic device according to claim 12, wherein the electrochromic layer comprises an electrochromic material layer, an electrolyte layer and an ion storage layer which are stacked in sequence;

wherein the second partition region is filled with the same electrolyte material as that of the electrolyte layer so that the electrolyte layer is in contact with the partition groove through the electrolyte material in the second partition region.

15. The electrochromic device according to claim 12, wherein a second busbar is disposed on the second transparent conductive layer, a surface resistance of the second transparent conductive layer is greater than a surface resistance of the first transparent conductive layer, and the second busbar is disposed along a periphery of the first conductive region.

16. The electrochromic device according to claim 12, wherein the electrochromic layer comprises an electrochromic material layer, an electrolyte layer and an ion storage layer which are stacked in sequence;

a surface resistance of the second transparent conductive layer is greater than a surface resistance of the first transparent conductive layer; and the electrochromic material layer is located on a side close to the second transparent conductive layer.

* * * * *